United States Patent
Houjou et al.

(10) Patent No.: US 9,407,690 B2
(45) Date of Patent: Aug. 2, 2016

(54) PICTURE CONVERSION SNS SYSTEM AND METHOD, APPARATUS, AND TERMINAL

(71) Applicant: CASIO COMPUTER CO., LTD., Shibuya-ku, Tokyo (JP)

(72) Inventors: Yoshiharu Houjou, Tokyo (JP); Akihiro Tsukamoto, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 171 days.

(21) Appl. No.: 13/899,539

(22) Filed: May 21, 2013

(65) Prior Publication Data

US 2013/0318164 A1 Nov. 28, 2013

(30) Foreign Application Priority Data

May 24, 2012 (JP) ................................ 2012-118915

(51) Int. Cl.
| | |
|---|---|
| G06F 15/16 | (2006.01) |
| H04L 29/08 | (2006.01) |
| G06K 9/00 | (2006.01) |
| G06Q 50/00 | (2012.01) |

(52) U.S. Cl.
CPC ............ *H04L 67/10* (2013.01); *G06K 9/00677* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2009/0154762 A1 | 6/2009 | Choi et al. | |
| 2009/0221280 A1* | 9/2009 | Mitelberg | 455/418 |
| 2012/0250997 A1* | 10/2012 | Kumazaki et al. | 382/167 |

FOREIGN PATENT DOCUMENTS

| | | |
|---|---|---|
| CN | 102054285 A | 5/2011 |
| JP | 2005-134272 A | 5/2005 |
| JP | 2006-309660 A | 11/2006 |
| JP | 2007-079900 A | 3/2007 |
| JP | 2008-242639 A | 10/2008 |

OTHER PUBLICATIONS

Chinese Office Action (and English translation thereof) dated Nov. 16, 2015, issued in counterpart Chinese Application No. 201310193853.7.
"Love iPhone Photography", Beijing: Posts and Telecom Press, Dec. 2011.

* cited by examiner

*Primary Examiner* — Esther B Henderson
(74) *Attorney, Agent, or Firm* — Holtz, Holtz & Volek PC

(57) ABSTRACT

A membership social network system includes a processor configured to select a picture type among a plurality of picture types, and to, according to parameters, change a tone of original image data, which is uploaded from a member terminal to a server, to a tone of a selected picture type, a browse controller configured to make a tone-changed image data, which is created by the processor, browsable on the member terminal, and a grouping module configured to group a member who uploads the original image data and a member who creates the tone-changed image data.

4 Claims, 22 Drawing Sheets

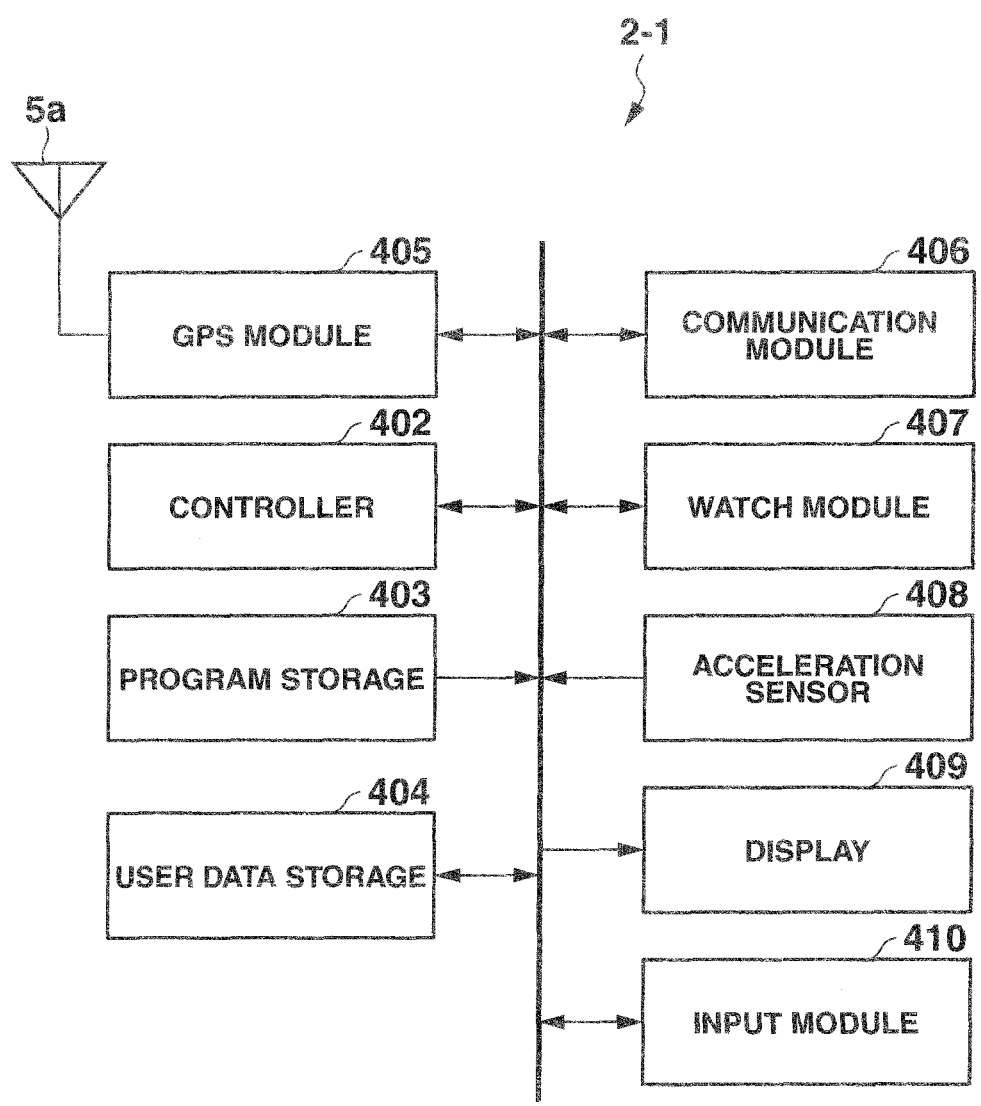

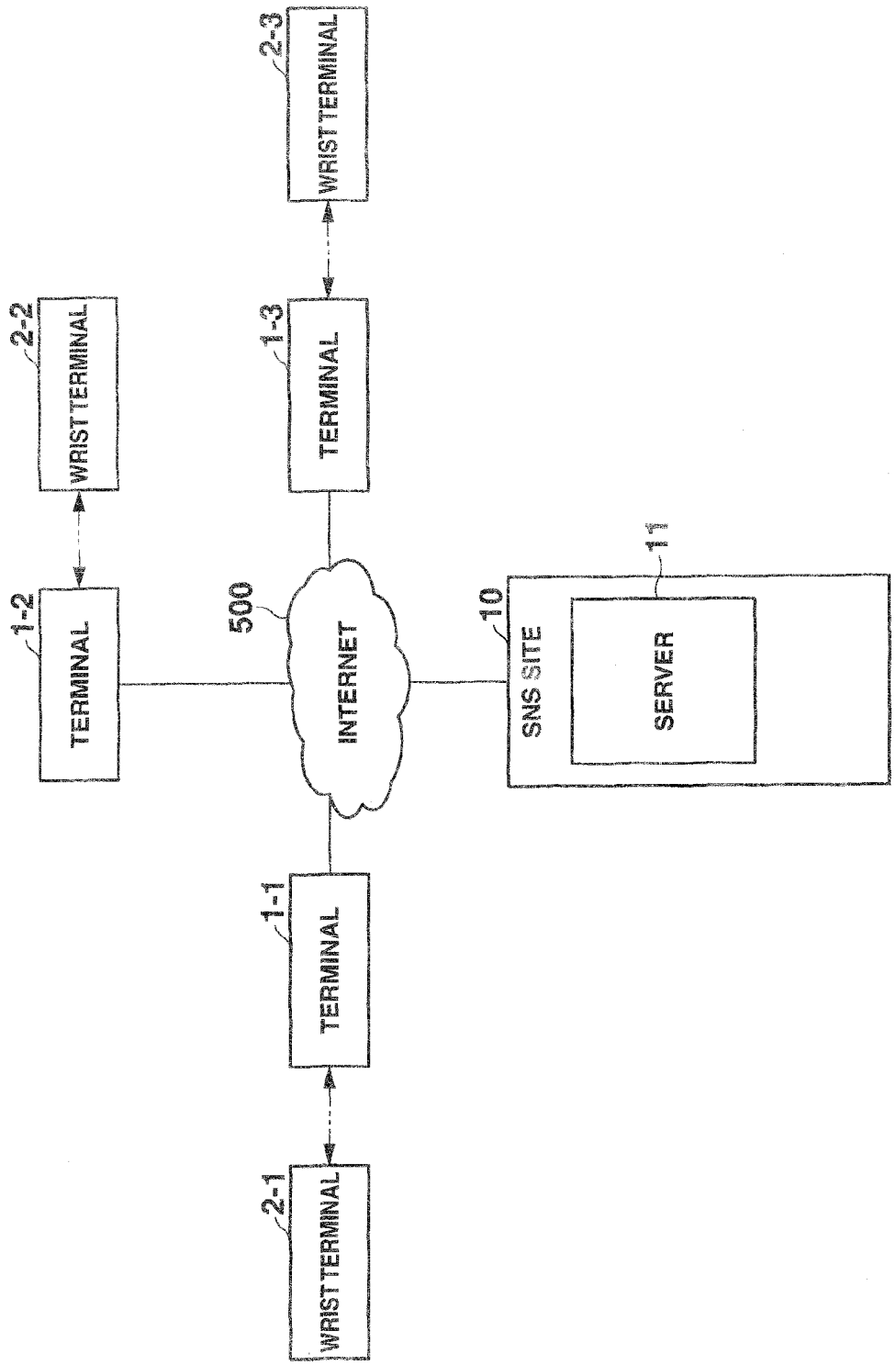

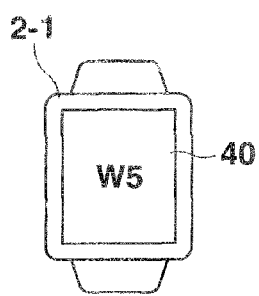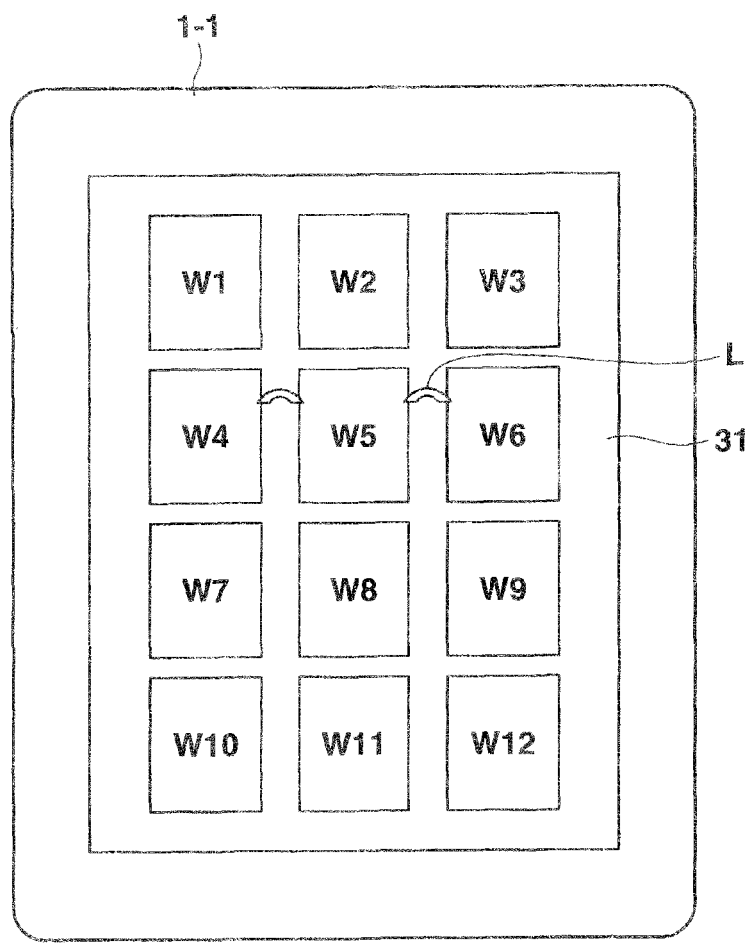

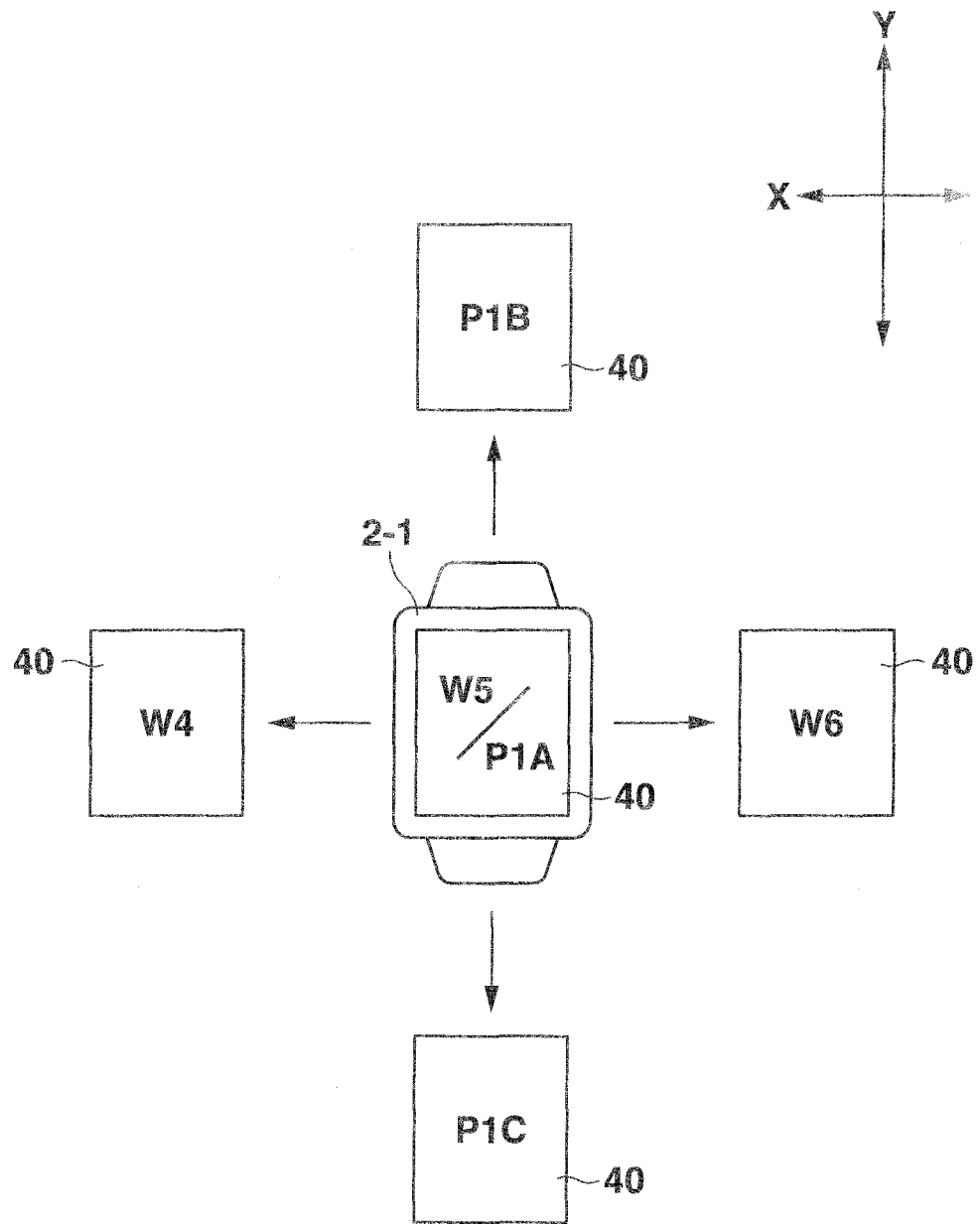

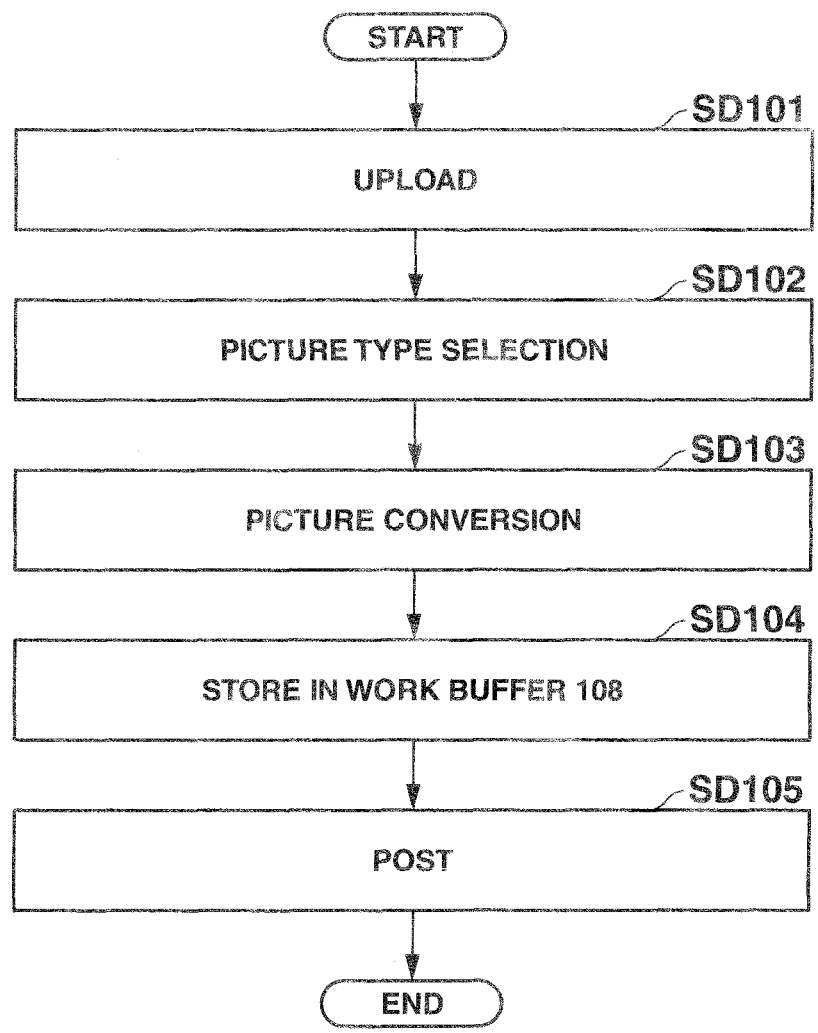

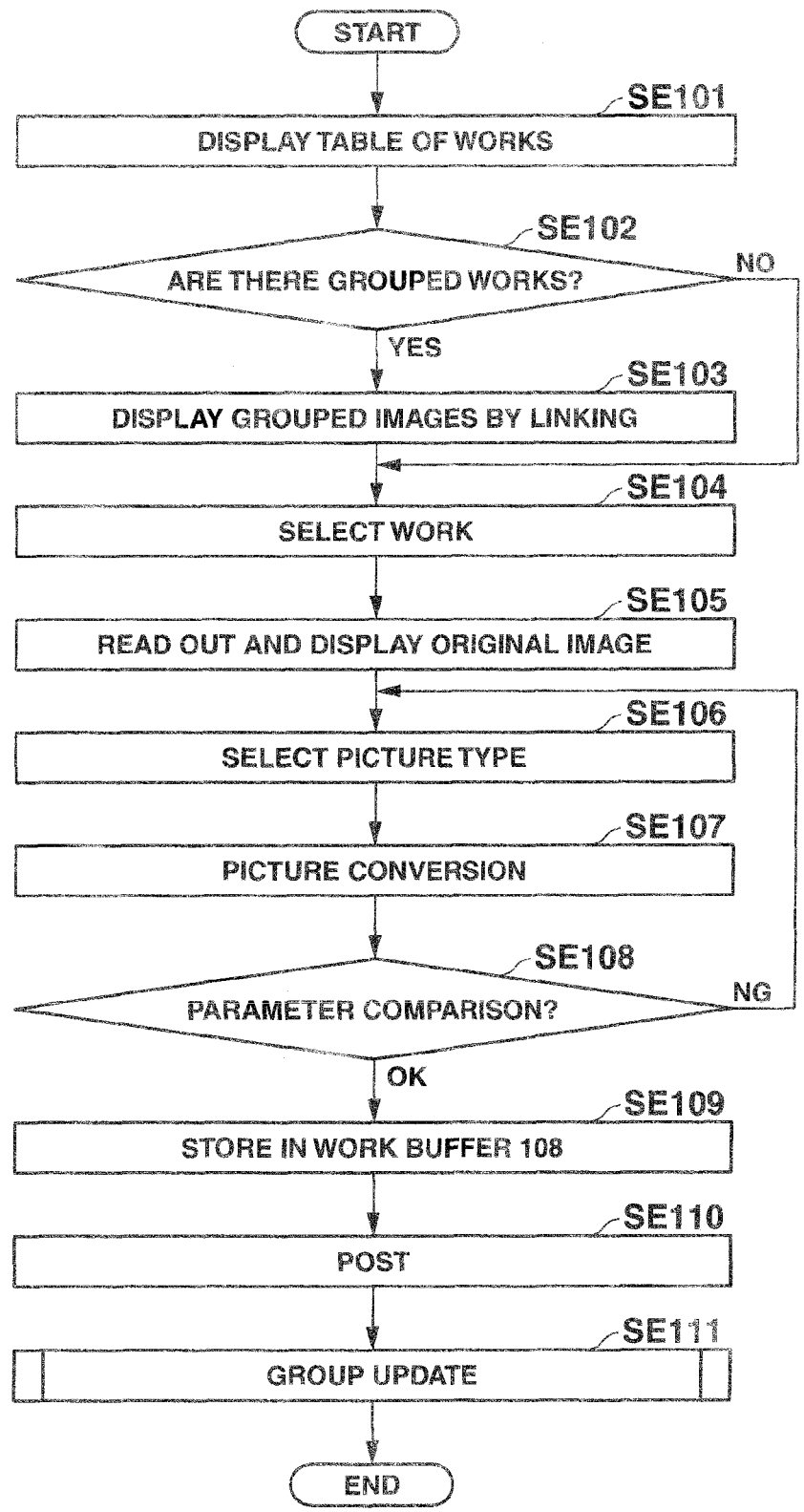

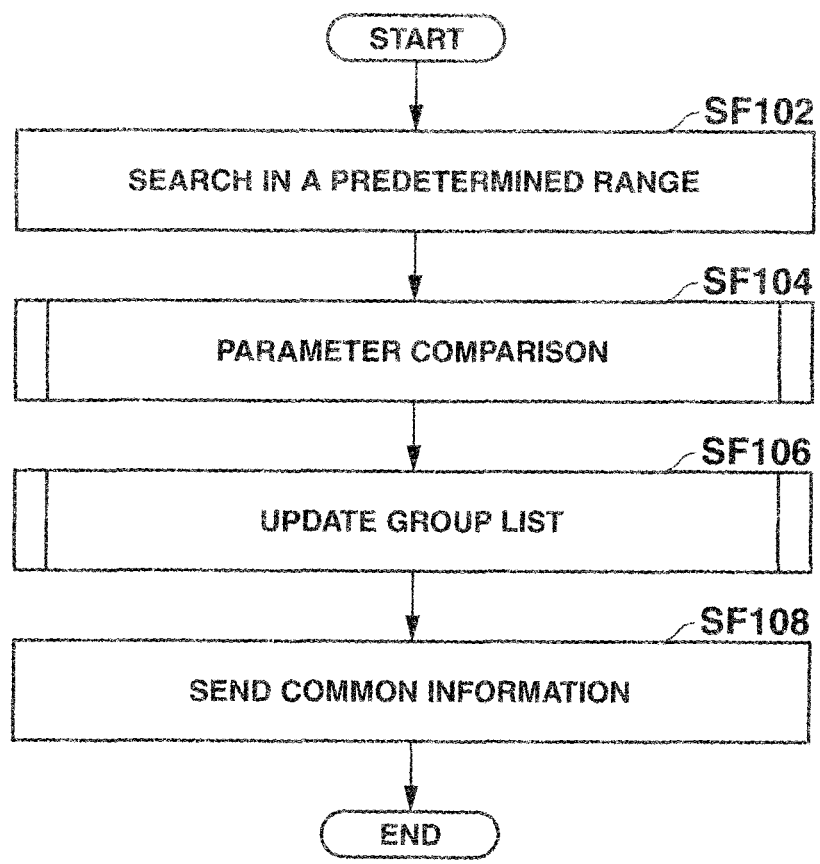

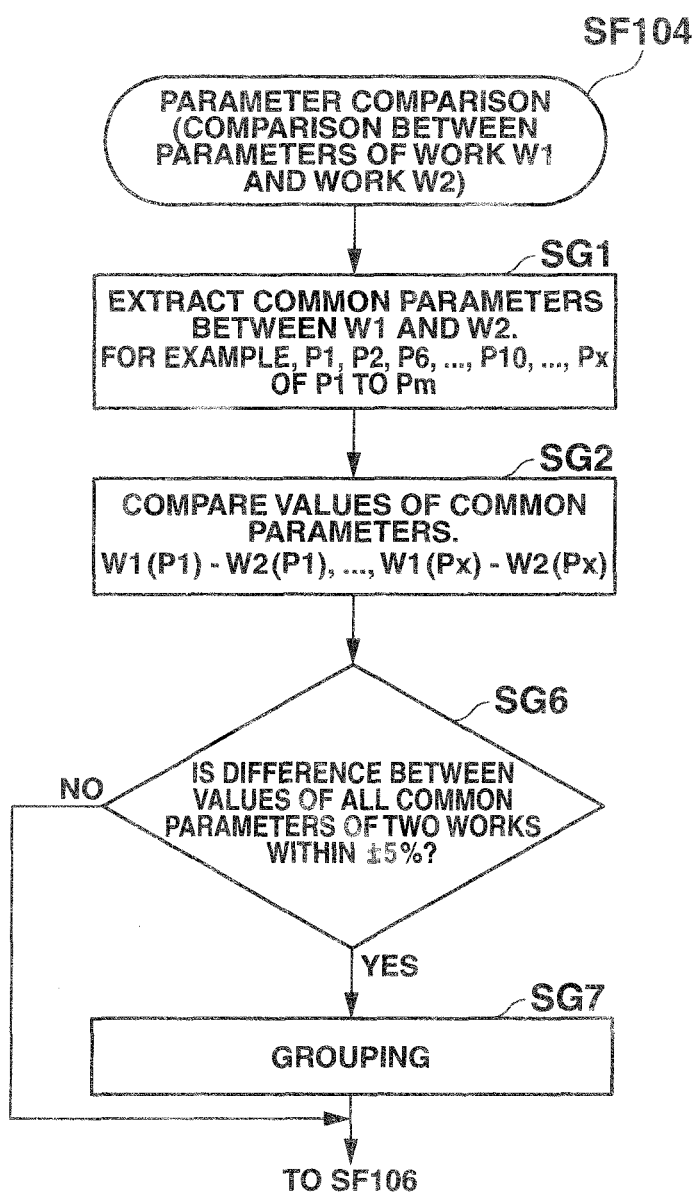

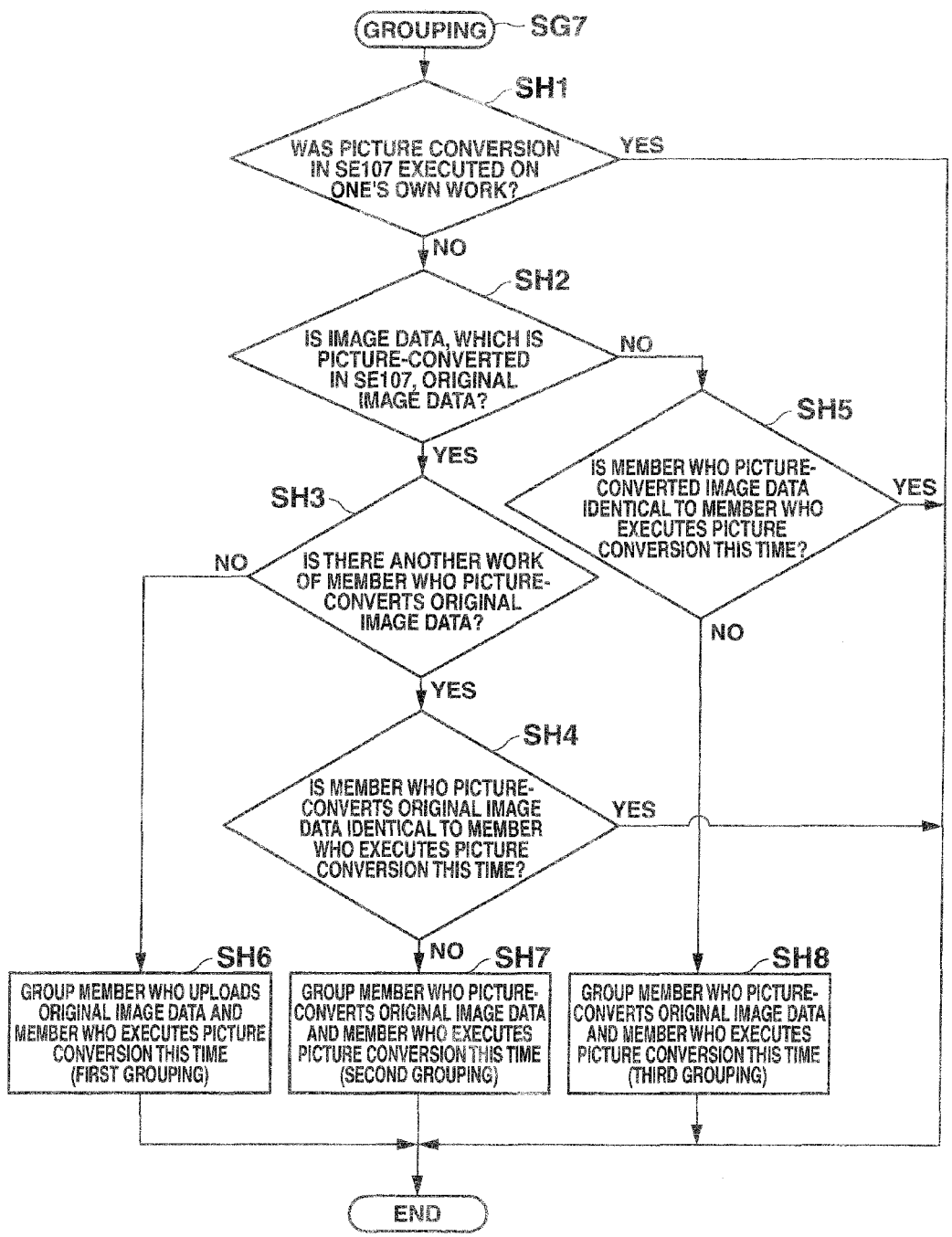

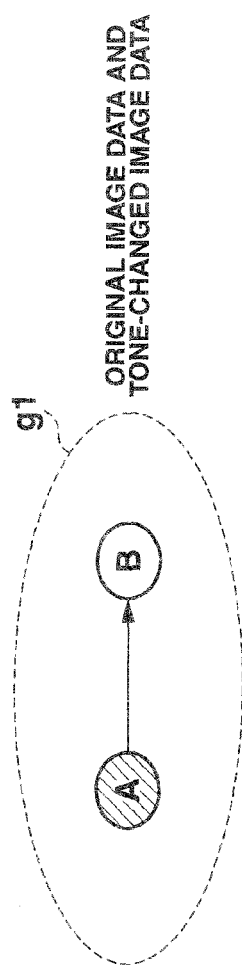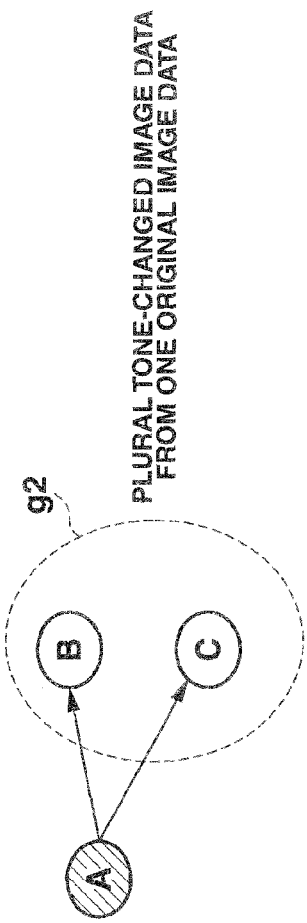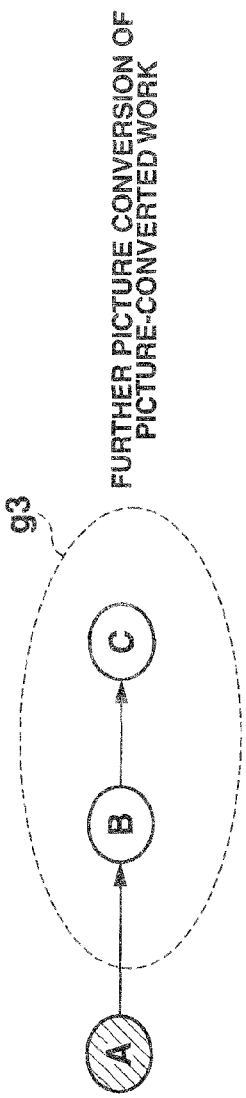

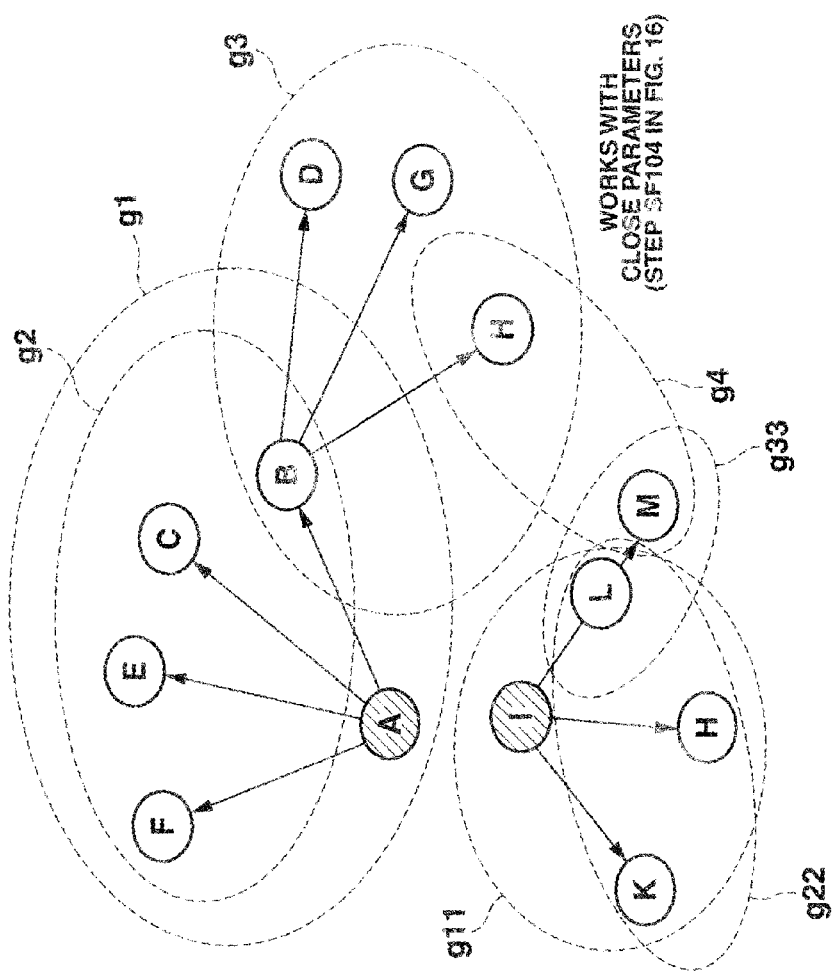

PICTURE CONVERSION SNS SYSTEM AND METHOD, APPARATUS, AND TERMINAL

CROSS-REFERENCE TO RELATED APPLICATIONS

This application is based upon and claims the benefit of priority from prior Japanese Patent Application No. 2012-118915, filed May 24, 2012, the entire contents of which are incorporated herein by reference.

BACKGROUND OF THE INVENTION

1. Field of the Invention

The present invention relates to an SNS (social network service) system and method which performs an image processing, a picture conversion SNS apparatus, and a wrist terminal.

2. Description of the Related Art

In recent years, a members-only communication service (social network system, hereinafter referred to as SNS) has been gaining in popularity. In general, the SNS system is constructed not by a tree structure but by a semi-lattice structure. In the semi-lattice structure, unlike a tree set in which all lower-level sets are included in an upper-level set, a structural element of one set is included in a plurality of lower-level sets, and sets with interlaced inclusive relations are constituted.

In the SNS system, there is a concept of "friends" (see, e.g. Jpn. Pat, Appln. KOKAI Publication No. 2006-309660), and "friends" are one of sets. When attention is paid to certain members, a "friend" is a member who meets a predetermined condition, for example, a member whose "application for friend" has been granted.

For example, FIG. 21 illustrates a friend network in a case where attention is paid to member "A". Members "B", "C" and "D" have a friend relationship with member "A", members "B1" and "B2" have a friend relationship with "B", and "B11" and "B12" have a friend relationship with "B1". Further, member "D1" has a friend relationship with member "D", and members "D11" and "D12" have a friend relationship with "D1".

As indicated by r1 in FIG. 21, there may be a case in which member "D12", who is a friend of member "D1" who is a friend of member "D" who is a friend of member "A", has a friend relationship with member "A".

In the meantime, in such an SNS, there are many cases in which members show photos, which are stored on a server via a network, to each other (see, e.g. Jpn. Pat. Appln. KOKAI Publication No. 2008-242639).

In the description below, a member uploads a photo to a server, and the photo itself which is publicized on the Internet as such, or an image which is created by subjecting the photo to image processing and is publicized on the Internet, is referred to as "work".

In the SNS system, a picture conversion service for image data is provided. There are many types of picture conversion, such as oil painting, impasto, gothic oil painting, fauvist oil painting, watercolor, gouache, pastel, color pencil, pointillism, silkscreen, drawing, and air brush. The type of each picture conversion has a unique feature and peculiarity. Thus, the selection of the type of picture conversion varies depending on the member's preference, and in many cases the type of picture conversion, which suits the member's preference, is selected.

In the technique of Jpn. Pat, Appln. KOKAI Publication No. 2006-309660, members simply create friend relationships with other members with whom they wish to have such friend relationships. In the technique of Jpn. Pat. Appln. KOKAI Publication No. 2008-242639, posted photos are merely shared. In the actual situation, it has riot been practiced to increase an interest by merging a picture conversion technology into an SNS or, conversely, by merging an SNS into a picture conversion technology.

BRIEF SUMMARY OF THE INVENTION

The present invention has been made in consideration of the above-described situation, and an object of the invention is to provide a picture conversion SNS system and method which can increase an interest by merging a picture conversion technology into an SNS, and a picture conversion SNS apparatus.

Another object of the invention is to provide a wrist terminal which is used in the picture conversion. SNS system, thereby increasing an interest relating to display and display change. According to the present invention, a membership social network system includes a processor configured to select a picture type among a plurality of picture types, and to, according to parameters, change a tone of original image data, which is uploaded from a member terminal to a server, to a tone of a selected picture type; a browse controller configured to make a tone-changed image data, which is created by the processor, browsable on the member terminal; and a grouping module configured to group a member who uploads the original image data and a member who creates the tone-changed image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed, description of the embodiments given below, serve to explain the principles of the invention.

FIG. 2 is a block diagram illustrating the outline of a circuit configuration of the wrist terminal.

FIG. 3 is a block diagram illustrating the whole structure of a picture conversion system according to an embodiment.

FIG. 6A is a view illustrating a display example of the wrist terminal displaying one work.

FIG. 6B is a view illustrating a display example of a smartphone-type terminal displaying a table of a plurality of works.

FIG. 7 is a view illustrating a display procedure of the wrist terminal.

FIG. 14 is a flowchart illustrating the process procedure of an upload/posting process.

FIG. 15 is a flowchart illustrating the process procedure of a browse process.

FIG. 16 is a flowchart illustrating the process procedure of grouping update.

FIG. 17B is a flowchart, illustrating the process procedure of parameter comparison in FIG. 16.

FIG. 18 is a flowchart illustrating the process procedure of grouping.

FIG. 19A, FIG. 19B and FIG. 19C are views illustrating examples of grouping.

FIG. 20 is a view for explaining a relationship between grouped members.

DETAILED DESCRIPTION OF THE INVENTION

Embodiments of the present invention will now be described with reference to the accompanying drawings.

Figure 1:
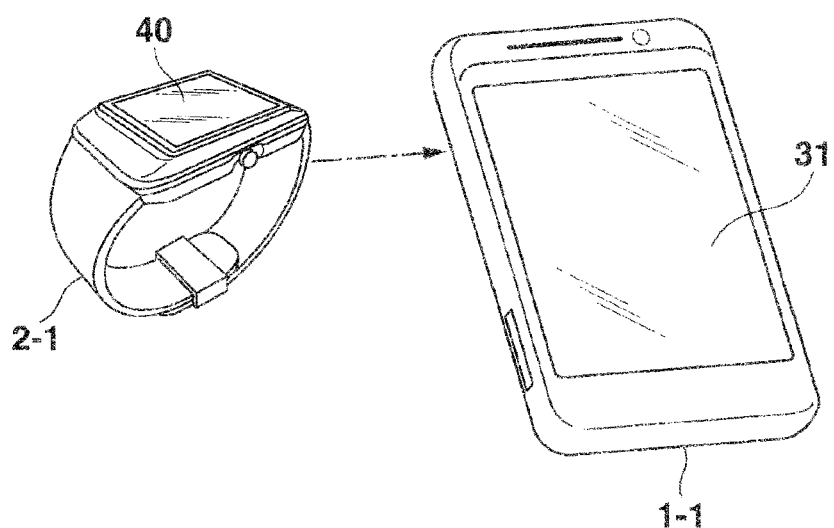
FIG. 1 is a view illustrating a terminal and a wrist terminal.

FIG. 1 is a view illustrating images of a terminal 1-1 and a wrist terminal 2-1, which are used in a picture conversion system according to an embodiment of the invention. The terminal 1-1 and wrist terminal 2-1 are wirelessly connected by, for example, Bluetooth (trademark), and can exchange data. Each of the terminal 1-1 and the wrist terminal 2-1 is connectable to an SNS site 10 via the Internet 500 by, e.g. Wi-Fi. The wrist terminal 2-1 is structured in a watch shape, and includes a screen 40.

FIG. 2 is a block diagram illustrating a circuit configuration of the wrist terminal 2-1. The wrist terminal 2-1 includes a controller 402, a program storage 403, a user data storage 404, a GPS module 405, a communication module 406, a watch module 407, an acceleration sensor 408, the screen 40, and an input module 410.

The controller 402 is composed of a CPU (Central Processing Unit), a peripheral circuit of the CPU, and a working memory such as a RAM (Random Access Memory), and controls the entire operation of the wrist terminal 2-1.

The GPS module 405 measures a present position by making use of a publicly known GPS (Global Positioning System). Specifically, the GPS module 405 acquires position data including a latitude and a longitude indicative of the present position, by receiving by an antenna 5a radio waves transmitted from a plurality of positioning satellites (GPS satellites), and supplies the acquired position data to the controller 402 as location information indicative of a location of action of the user.

The communication module 406 includes a wireless communication function by, e.g. Bluetooth (trademark). The communication module 406 can exchange data with the terminal 1-1 by wireless connection, and includes a function of directly connecting to the SNS site 10 by Wi-Fi.

The watch module 407 counts the present time, and supplies time data indicative of the present time to the controller 402. The watch module 407 includes a calendar function, and supplies present date data and day-of-week data to the controller 402.

The acceleration sensor 408 is mainly composed of an acceleration sensor, an amplifier for amplifying a detection signal of the acceleration sensor, and an A/D converter. The acceleration sensor 408 supplies waveform data, which is indicative of a variation in acceleration in two axis directions (a right-and-left direction (X direction) and an up-arid-down direction (Y direction) as shown in FIG. 7) in the wrist terminal 2-1, to the controller 402 as action. information indicative of the action of the user.

The program storage 403 is, for example, a ROM (Read Only Memory) which stores various programs and data, which are needed by the controller 402 (specifically the CPU) to control the wrist terminal 2-1. The programs stored in the program storage 403 include a program which causes the controller 402 to execute a display change process illustrated in display transition diagrams of FIG. 7 and FIG. 8 (to be described later). The terminal 1-1 stores an application program for using the SNS site 10, and the program storage 403 of the wrist terminal 2-1 similarly stores an application program for using the SNS site 10, although this application program is lighter than the application program of the terminal 1-1.

FIG. 3 is a block diagram illustrating the whole structure of the present embodiment. The SNS site 10 including a server 11 is connected to terminals 1-1, 1-2, 1-3, . . . , of members via the Internet 500. The terminals 1-1, 1-2, 1-3, . . . , are, for instance, smartphones or personal computers. In addition, numerals 2-1, 2-2, 2-3, . . . , denote wristwatch-type wrist terminals which are wearable on the arms, and the wrist terminals 2-1, 2-2, 2-3, . . . , are wirelessly connected to the terminals 1-1, 1-2, 1-3, . . . .

Figure 4A:
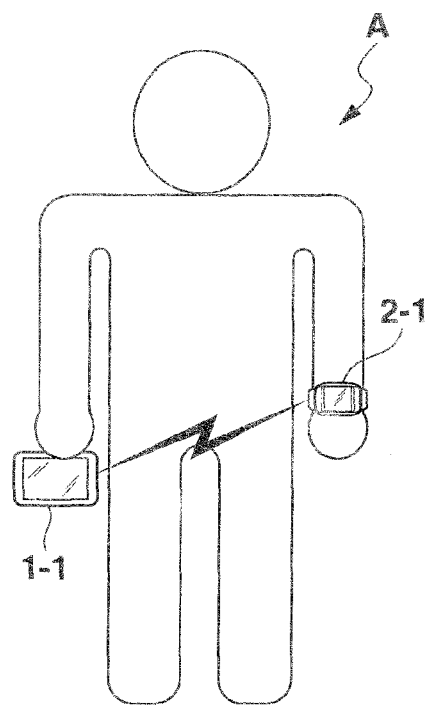
FIG. 4A and FIG. 4B are views illustrating modes of use of the terminal and wrist terminal.
Figure 4B:
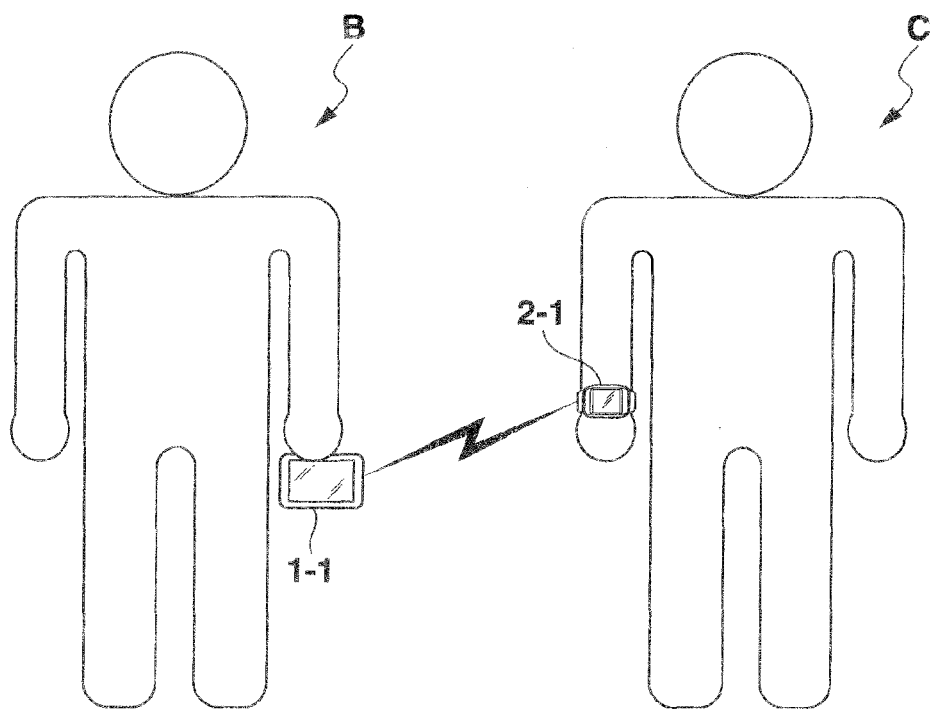

FIG. 4A and FIG. 4B illustrate modes of use of the terminal 1-1 and wrist terminal 2-1. FIG. 4A illustrates a mode of use in which member "A" possesses the terminal 1-1 and connects the terminal 1-1 to the SNS site 10 via a mobile phone network and the Internet, and also possesses the wrist terminal 2-1 and receives part of information, such as profile information of grouped members, works such as picture-type image data, or e-mails, by the wrist terminal 2-1. According to this mode of use, even if the wrist terminal 2-1 does not have a function of connection to the Internet 500, the wrist terminal 2-1 can receive, for example, profile information of friend members, e-mails, etc.

FIG. 4B illustrates another mode of use. In this mode of use, when member "B" possesses the terminal 1-1 and member "C", who does not possess the terminal 1-1, possesses the wrist terminal 2-1, if member "B" and member "C" come close to each other, data exchange is enabled between the terminal 1-1 of member "B" and the wrist terminal 2-1 of member "C". According to this mode of use, even if member "C" does riot possess the terminal 1-1 which has the function of connection to the Internet 500, member "C" can obtain information which is acquired via the Internet 500.

Figure 5A:
FIG. 5A and FIG. 5B are views illustrating display examples of the wrist terminal.
Figure 5B:
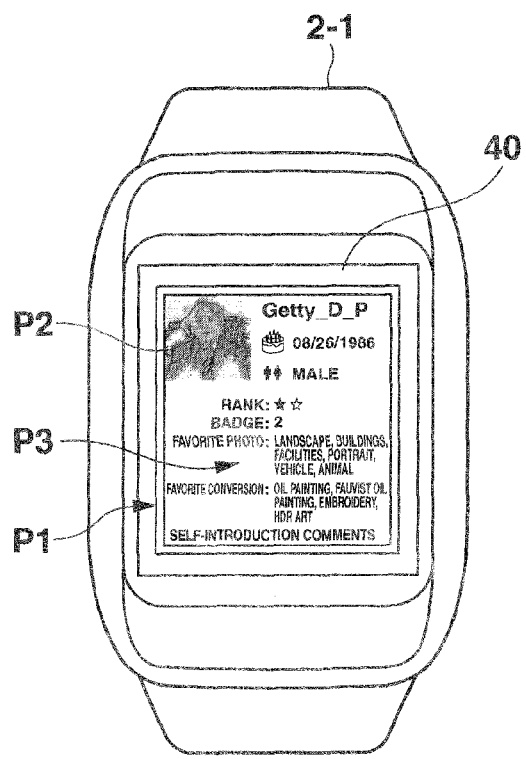

FIG. 5A and FIG. 5B illustrate display examples of the wrist terminal 2-1. Usually, as illustrated in FIG. 5A, the wrist terminal 2-1 displays time screen P4 including the present year/month/day, a day of the week, and hour/minute. By detecting that another member who is grouped has come near within a predetermined range, the profile image or works of this member who has come near are automatically be displayed, as illustrated in FIG. 5B. At the same time, notification by sound or vibration may be made.

The "within a predetermined range", in this context, means "within a predetermined distance" or "when a radio wave intensity has increased to a predetermined value or more". With the GPS being built in the wrist, terminal 2-1, the position of presence and time can be specified. Thus, not only the real-time comparison, but also display such as "the member was near several minutes before" can be performed. With this wrist terminal 2-1, too, a work, which is image data converted to a picture type, can be viewed.

Thereby, even if a member puts the terminal 1-1 in a bag or the like, if the member wears the wrist terminal 2-1 as a wristwatch, the member can easily confirm the profile image of the member himself/herself, a friend member or a grouped member, or can view the work.

FIG. 6A and FIG. 6B are views illustrating display examples of the terminal 1-1 and wrist terminal 2-1. FIG. 6A illustrates a state in which one work is displayed on the wrist terminal 2-1. FIG. 6B illustrates a state in which a table of a plurality of works are displayed on a smartphone-type terminal 1-1.

Specifically, FIG. 6B illustrates a state in which a table of thumbnails W1 to W12 of 12 works are displayed on a screen 31 of the smartphone-type terminal 1-1. FIG. 6A illustrates a state in which one of the thumbnails W1 to W12, for example, thumbnail W5, is displayed on a screen 40 of the wrist terminal 2-1.

The display area of the screen 31 of the smartphone-type terminal 1-1 differs from the display area of the screen 40 of the wrist terminal 2-1. The display area of the screen 40 of the wrist terminal 2-1 is smaller than the screen 31 of the smartphone-type terminal 1-1.

The wrist terminal 2-1 displays the thumbnail W5 of one work, and the smartphone-type terminal 1-1 displays the thumbnails W1 to W12 of 12 works, centering on the thumbnail WE of the one work. The display of the smartphone-type terminal 1-1 is an arbitrary one, for example, display in an order beginning with the latest, work, display of works of the same member, display of works of the same picture type, or random display. As shown in FIG. 6B, works of grouped members are linked by a chain-like link display symbol L.

In addition, only works of grouped members may be displayed in a table format. In this case, works of members grouped in the same group are extracted and aggregated in a display buffer 30. Then, the link display symbol L is effected on the thumbnails of all works. The chain-like link display symbol L is a mere example, and, for example, the peripheries of works may be colored in the same color. If W1 to W5 are one group, W6 to W9 are another group and W10 to W12 are still another group, it is thinkable that the peripheries of W1 to W5 are colored in yellow, the peripheries of W6 to W9 are colored in green, and the peripheries of W10 to W12 are colored in blue. FIG. 7 is a view illustrating a display example of the wrist terminal 2-1. The screen 40 of the wrist terminal 2-1 displays the thumbnail W5 of the work of one picture-style image. With this thumbnail W5 being the center, if the wrist terminal 2-1 is shaken in the up-and-down direction (Y direction) or in the right-and-left direction (X direction), the built-in acceleration sensor 400 detects the shake, and the controller 402 executes a process of changing the image that is displayed on the screen 40, according to the program stored in the program storage 403. For example, when the wrist terminal 2-1 is shaken to the upper side in the vertical direction (Y direction), a profile image P1B is displayed. When the wrist terminal 2-1 is shaken to the right side in the horizontal direction (X direction), a thumbnail W6 is displayed. When the wrist terminal 2-1 is shaken to the lower side in the vertical direction (Y direction), a profile image P1C is displayed. When the wrist terminal 2-1 is shaken to the left side in the horizontal direction (X direction), a thumbnail W4 is displayed. This image change, or the image feed operation, can be realized by lightly shaking the wrist terminal 2-1 in the up-and-down direction or right-and-left direction, since the wrist terminal 2-1 includes the acceleration sensor 408. Besides, the feed operation may be performed by a twisting action of the wrist, or by a slide operation, with a touch panel being formed on the screen 40.

By the shake in the up-and-down direction, the controller 402 executes control to successively display profile images (e.g. P1B, P1C) of other members grouped in the same group. By the shake in the right-and-left direction, the controller 402 executes control to successively display other picture-style image data (e.g. W4, W5) that are created by converting the picture-style image data, which is currently displayed on the screen 40 of the wrist terminal 2-1, to other types of picture style.

Figure 8:
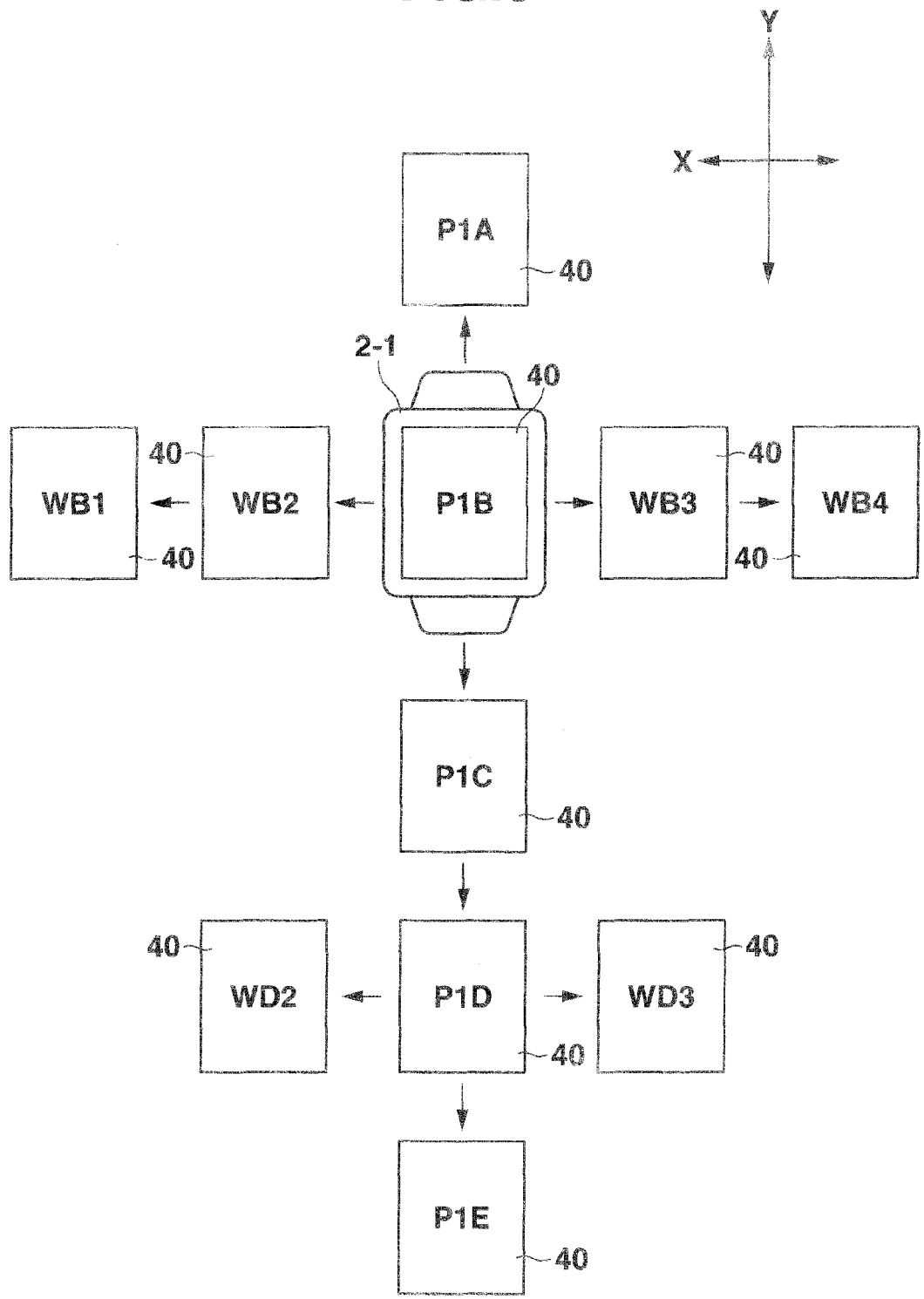
FIG. 8 is a view illustrating another display procedure of the wrist terminal.

In a modification, by the shake in the right-and-left direction, works of other members grouped in the same group may be successively displayed. By the shake in the up-and-down direction, other picture-style image data that are created by converting one's own picture-style image data, which is currently displayed on the display of the wrist terminal, to other types of picture style, may be successively displayed. The picture conversion process may be executed after detecting the acceleration by the acceleration sensor 408, or images, which have been converted and prepared in advance, may be displayed. In the latter case, many picture-style image data are arranged in a virtual space, and the picture-style image data are displayed by moving the wrist terminal 2-1 in the virtual space. FIG. 8 is a view illustrating another display example of the wrist terminal 2-1. FIG. 8 is a view for describing a state in which profile images of members are successively displayed by vertical feed (Y direction) and works of a selected member are successively displayed by horizontal feed (X direction).

Assume now that a profile image P1B of member "B" is displayed on the screen 40 of the wrist terminal 2-1. In this state, if a vertical (Y direction) feed operation is performed, the controller 402 successively displays profile images (e.g. P1A, P1C, P1D, P1E) of other members. If a horizontal (X direction) feed operation is performed in the state in which the profile image PIB of member "B" is displayed, the controller 402 successively displays thumbnails of other works (e.g. WB1, WB2, WB3, WB4) of member "B". In addition, if a horizontal (X direction) feed operation is performed in the state in which a profile image P1D of member "D" is displayed, the controller 402 successively displays thumbnails of other works (e.g. WD2, WD3) of the member "D". Thereby, even with the wrist terminal having a small display area, profile images and works of various members can be efficiently viewed. In the meantime, the data, which the above-described wrist terminal 2-1 displays on the screen 40, is received from the terminal 1-1 by the communication module 406 and is stored in the user data storage 404.

The details of the SNS site 10 will be described.

Figure 9:
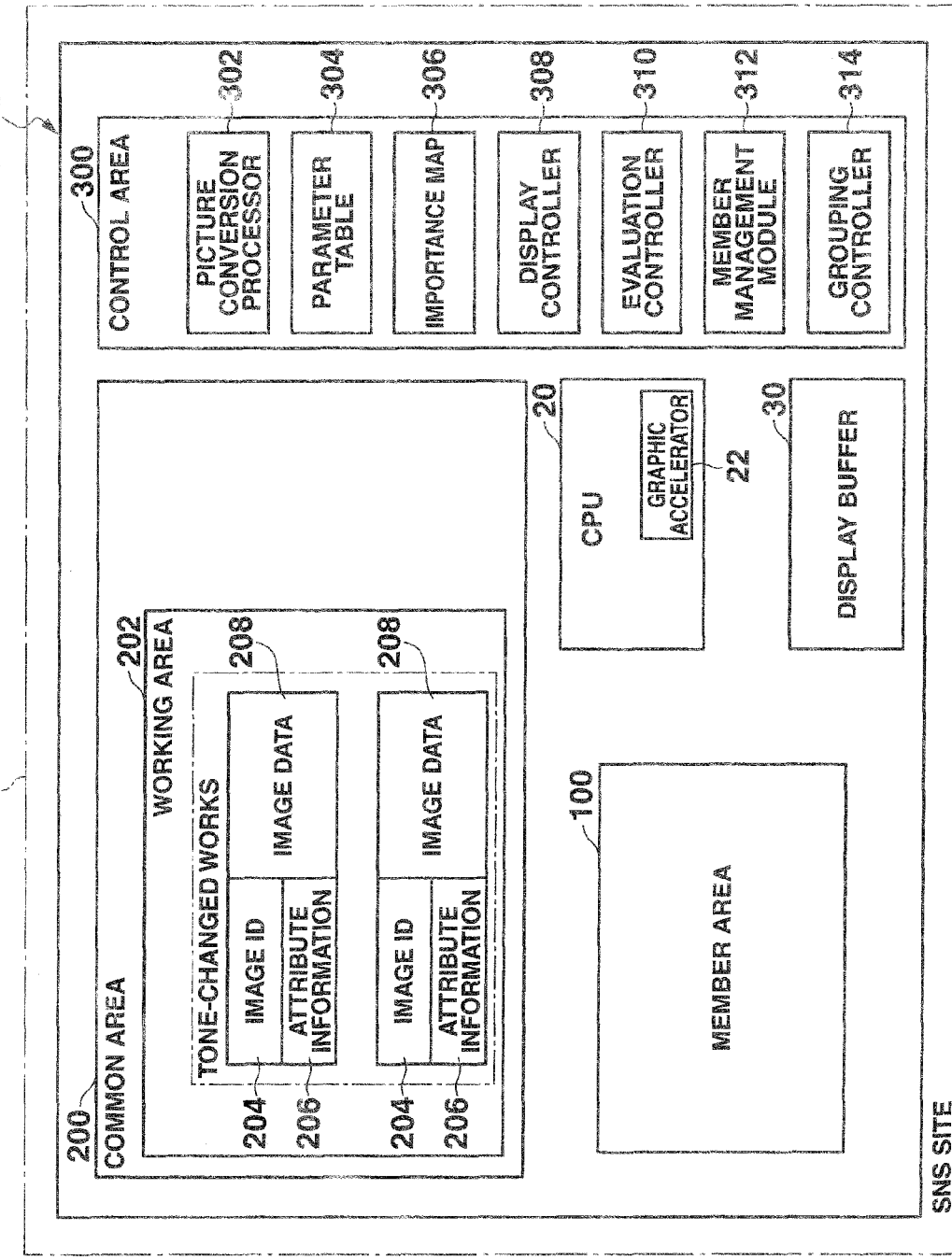
FIG. 9 is a block diagram. illustrating a main part of the structure of a server which realizes an SNS site.
Figure 10:
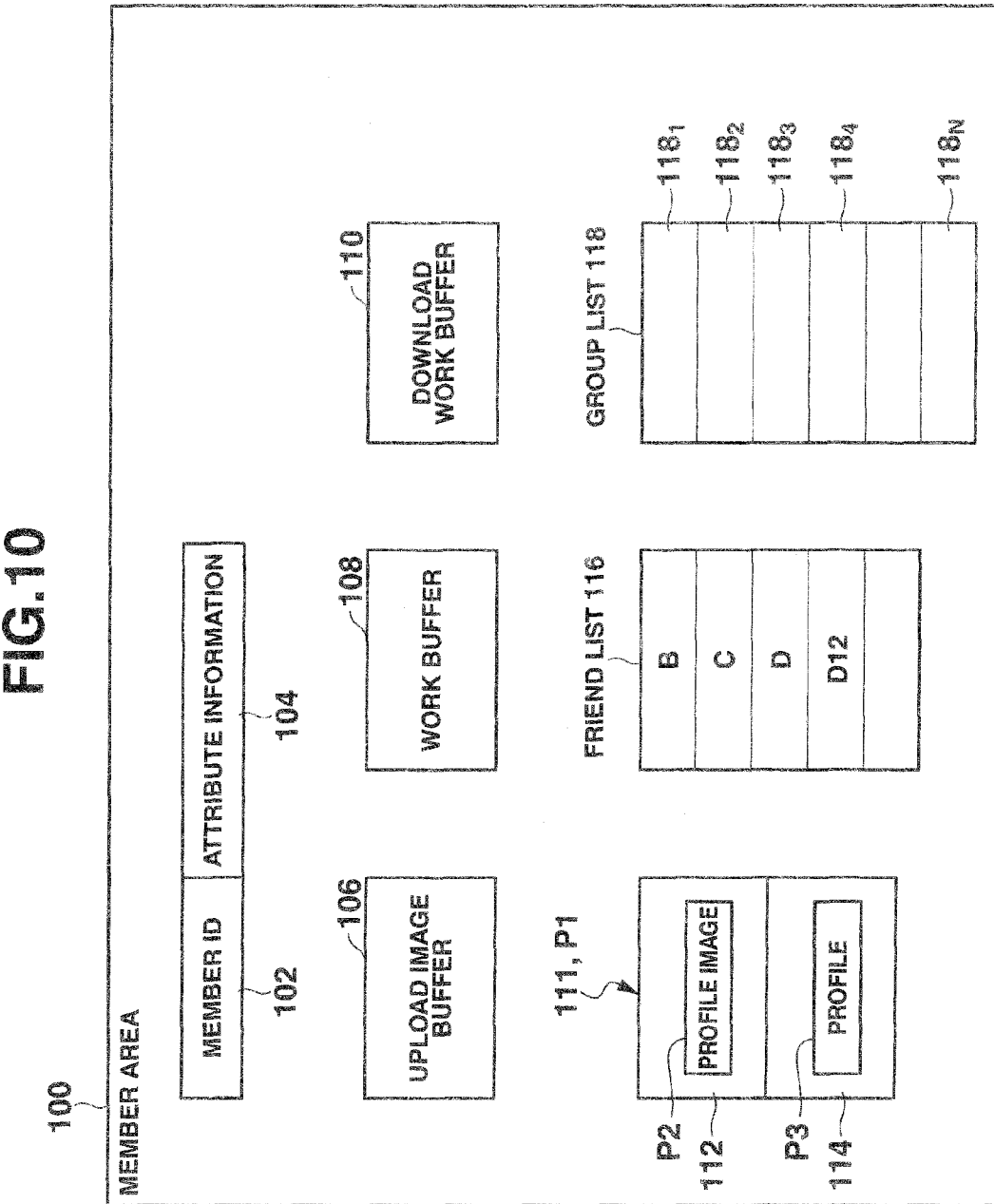
FIG. 10 is a block diagram illustrating the details of a member area.
Figure 11:
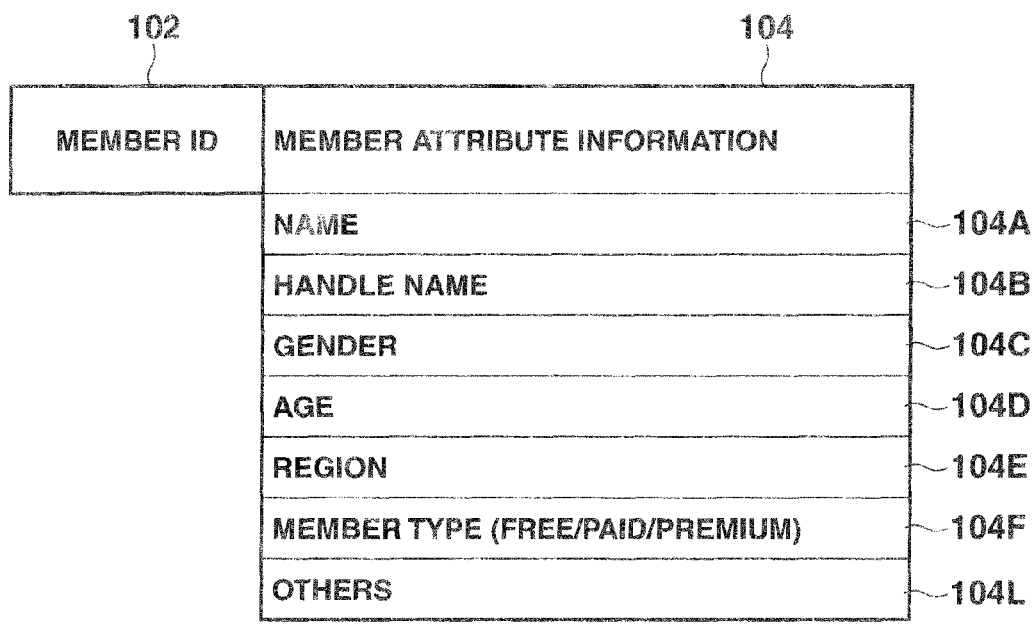
FIG. 11 is a view illustrating contents of member attribute information.
Figure 12:
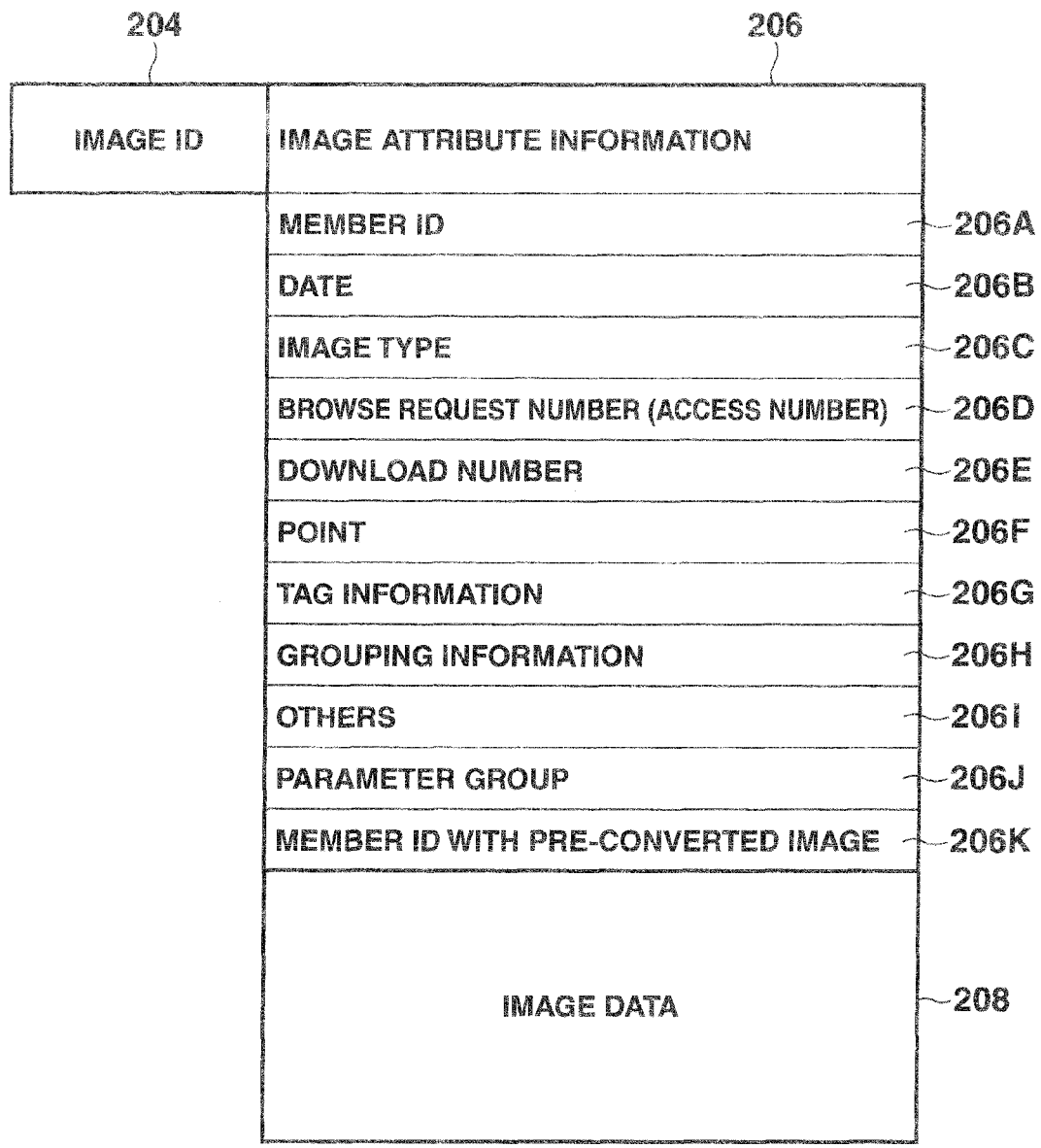
FIG. 12 is a view illustrating contents of image attribute information.

FIG. 9 is a block diagram illustrating a main part of the structure of the server 11 which realizes the SNS site 10. FIG. 10 is a block diagram illustrating the details of a member area. FIG. 11 is a view illustrating contents of member attribute information. FIG. 12 is a view illustrating contents of image attribute information.

As illustrated in FIG. 9, the server 11 includes a member area 100, a common area 200 and a control area 300.

As illustrated in detail in FIG. 10, the member area 100 is an area which is provided for each registered member, and stores a member ID 102 for identifying the member, and various member attribute information 104 of each member in association with the member ID 102.

The member attribute information 104 includes, for example, as shown in FIG. 11, a name 104A, a handle name 104B, a gender 104C, an age 104D, a region 104E, a member type 104N, a friend list 140J, a group list 104K, and others 104L. The member type 104F includes a free member who is simply registered for free, a paid member who is registered with payment, or a premium member who paid a special membership fee.

The member area 100 (FIG. 10) includes an upload image buffer 106 in which image data of photos uploaded by the member is stored, a work buffer 108 in which picture-tone images (works), which have been picture-converted in the SNS site 10, are stored, a download work buffer 110 which stores downloaded works of other members, a profile image storage. 111 storing profile image P1, a profile image storage 112 storing profile image P2, a profile image storage 114 storing profile P3, a friend list 116 in which member IDs of members, who are friends of the target member, are stored, and a group list 118.

IDs of friend members of a target member are stored in the friend list 116. Information indicative of a group into which the target member is grouped is stored in the group list 118. The type of grouping includes followings.

(1) Grouping a target member uploading an original image data and a member performing a picture conversion for the uploaded original image data by use of a picture conversion processor.

(2) Grouping a member performing a picture conversion for the original image data and a member performing another picture conversion for the original image data to create another picture converted image data.

(3) Grouping a member performing a picture conversion for the original image data and a member performing a picture conversion for converted picture to create another picture converted image.

The group list 118 includes N areas $118_1$ to $118_N$ divided for respective groups Member IDs for members ("B", "C", "D", and "E" in FIG. 20) who belong to the same group as the target member ("A" in FIG. 20) are stored in the areas $118_1$ to $118_N$.

The common area 200 in FIG. 9 is an area which is provided common to all members. The common area 200 includes a work area 202 in which many picture-converted or tone-changed works, which were created by changing a tone of the images uploaded by members to different tones, are stored.

Each of works stored in the work area 202 includes image data 208, an image ID 204 for identifying the work, and image attribute information 206 indicative of the attribute of each image.

As shown in FIG. 12, the image attribute information 206 includes a member ID 206A indicative of the poster of the work, date information 206B of, e.g. a date of creation or a date of posting, image type information 206C such as a size of image data and type of picture tone, browse request number (access number) information 206D indicative of the number of times of browsing of the work, download number information 206E indicative of the number of times of download of the work, point information 206F indicative of the evaluation of the work, tag information 206C for attaching a tag indicating what the work relates to, such as a person, nature, flower, morning glory, etc., grouping information 206H indicative of a group if the work belongs to the group, and other information 2061 which is unique to the work. These information items are stored together with the image ID 204 and image data 200.

The original image data or tone-changed image data posted by another member may be subjected to a further picture conversion. For that reason, the image attribute information 206 further includes a member ID with an original (pre-tone-changed) image 206K and parameter group information used for tone change 206J. A further tone-changed image may be unnatural if the tone-changed image is subjected to a further picture conversion. In order to prevent this further conversion, an allowable picture type to which the tone-changed image is further changed can be determined base on the parameter group information 206J.

From the member ID 206A, the creator of the work is understood, and it can be determined whether the creator is a free member, a paid member or a premium member. In addition, from the tag information 206G, the work can be categorized. Furthermore, from the grouping information 206H, the work can be grouped. The category is based on an objective division and includes a category of oil painting, a category of HDR (High Dynamic Range), or the like. The group is based on a relevancy between members who are related to or interested in the image data posted by a member.

The control area 300 shown in FIG. 9 includes a picture conversion processor 302, a parameter table 304, an importance map 306, a display controller 308, an evaluation controller 310, a member management module 312, and a grouping controller 314.

The picture conversion processor 302 executes a picture conversion process for changing a tone of image data, which is stored in the upload image buffer 106, to another tone. The parameter table 304 stores parameters for picture conversion, which are referred to when the picture conversion process is executed. The importance map 306 stores importance values for a face region, background region, center region, and peripheral region. The display controller 308 stores a control program for displaying the work on the screen.

The evaluation controller 310 evaluates the works, which are stored in the work buffer 108 of the member area 100, in accordance with the number of times of access, and gives points to each work. The member management module 312 manages the members by the member IDs, and controls respective services for the free member, paid member and premium member. The member management module 312 also controls the SNS function of the SUS site 10. The grouping controller 314 executes a process of grouping members, as will be described later with reference to FIG. 18.

In addition, the SNS site 10 includes a CPU 20 and a display buffer 30. The CPU 20 controls the entirety of the server 11, based. on various control programs stored in the control area 300, and executes various processes which are necessary for displaying many works in a table format on the Internet. The CPU 20 includes a graphic accelerator 22 for executing a high-level graphic process. By the graphic accelerator 22, images can be categorized and displayed, as will be described later, by simply designating some conditions from driver software. In the meantime, the above-described driver software is, for example, a publicly known open GL with a high general-purpose applicability and an extension library for using the open GP.

The display buffer 30 is a working memory for developing images for display, when the CPU 20 displays many works in a table format.

Figure 13:
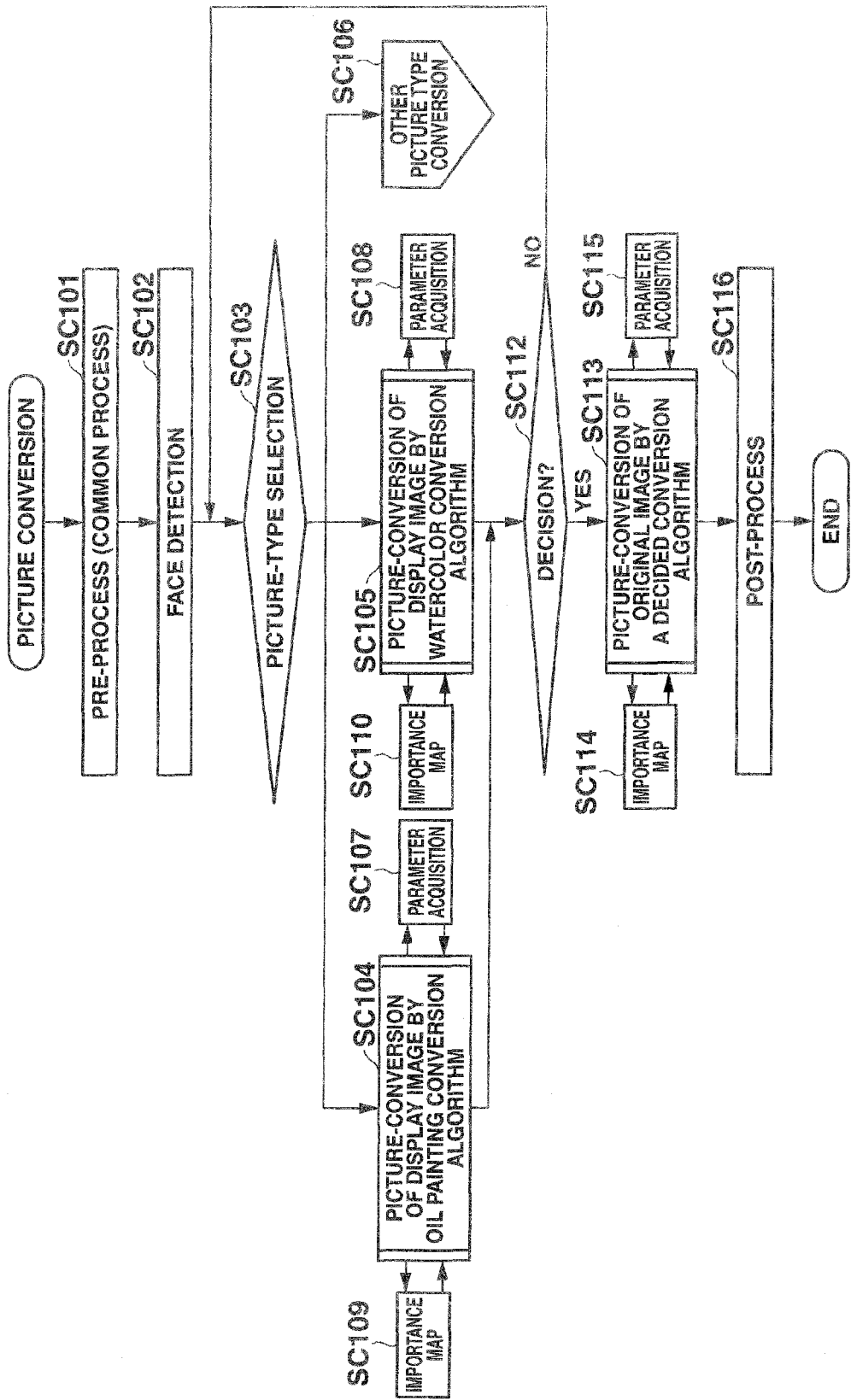
FIG. 13 is a flowchart illustrating the process procedure of a picture conversion process.

FIG. 13 is a flowchart illustrating a picture conversion process. To begin with, the picture conversion process technology is explained. The picture conversion is an image processing technology of converting each of pixels, which constitute an image such as a photo, in accordance with predetermined parameters (picture conversion parameters), to a so-called picture type such as oil painting, impasto, gothic oil painting, fauvist oil painting, watercolor, gouache, pastel, color pencil, pointillism, silkscreen, drawing, or air brush.

Basically, parameters of various effect processes, which are known in photo retouch software or the like, are adjusted and combined, whereby the pixels are picture-converted or tone-changed so as to appear like a picture style.

Examples of the effect process include: a texture process in which a texture is mapped on an image, thereby giving a special feel of texture; a resolution process in which an image is divided into a contour part, a texture part such as a fine pattern, and a flat part, and these parts are subjected to proper processes, thereby enhancing the feel of texture and resolution; an HSV process of classifying colors into three elements of hue, saturation and value and adjusting these elements; an RGB process of adjusting degrees of R (red), G (green) and B (blue) of an image; an RGB change process of performing a change in a direction of R to G, G to B, and B to R; an edge extraction process of applying a filter called "Laplacian filter"; a median density extraction process of applying a filter called "median filter"; a density extraction process of extracting an RGB histogram of neighboring pixels and executing processes in cases of extracting minimum/intermediate/maximum densities; an equalize process in which a darkest part of an image is set to be "black" and a lightest part of the image is set to be "white", and a histogram between "black" and "white" is properly distributed, thereby performing contrast correction or extending a histogram of the image; a gamma correction process of controlling an mediate brightness while maintaining a light part and a dark part; a shadow process of lightening a dark area of an image or darkening a light area of the image; a solarization process of inverting R, G, B values when R, G, B values of pixels have brightnesses of threshold or more; and a noise addition process of drawing dots at random, producing noise, and adjusting the amount noise or color.

There also is an effect process in which a photo with a dynamic range called HDR (High Dynamic Range), which cannot be expressed by an ordinary photo, is caused to fall within a narrow dynamic range by tone mapping, whereby a blocked-up whites due to over-exposure or a black crushing due to under-exposure is corrected and the power of expression is enhanced.

Specifically, the picture conversion process is, in principle, a kind of effect process. A picture conversion algorithm creates various picture types by combinations of effect processes and parameters, and this conversion algorithm is programmed.

Thus, the definition of the picture conversion in this specification is not limited to the conversion to a so-called artistic image such as an oil painting style or watercolor style, and includes HDR conversion by combinations of effect processes and parameters, conversion to an illustration-style image or a likeness-style image, and conversion to a deformed image in short, the picture conversion refers to conversion of an original photo to an image of a different tone or picture type, that is, a work of a different taste.

In the conversion algorithm, a parameter group P, which is a set of the above-described parameters for converting pixels of an original image, is prepared in advance. If the number of picture types is 12, the parameter groups are expressed as parameter groups P1 to P12. The picture type of a converted image varies depending on the manner of determining parameters. If the parameter group for conversion to an oil painting style is P1 and there are an m-number of parameters in the parameter group P1, which are necessary for an effect process for converting an image so as to appear as an oil painting style, the parameters are expressed as parameters $P1_1$ to $P1_m$.

In general, pixels are expressed by gradients of plural bits of R, G, B. The parameters are elements for subjecting the bit data to arithmetic operations. For example, when a red component is emphasized and a green component and a blue component are relatively restrained, an arithmetic operation, such as R×2, G×0.9, and B×0.5, is performed. In this case, "2", "0.9" and "0.5" are parameters. Alternatively, when arithmetic elements are programmed in advance and an arithmetic operation, such as R×1.1, is performed when an emphasis degree of red is "1", an arithmetic operation, such as R×1.2, is performed when an emphasis degree of red is "2" and an arithmetic operation, such as R×1.3, is performed when an emphasis degree of red is "3", these emphasis degrees are parameters.

In addition, there is a case in which a predetermined arithmetic operation is performed between a pixel of interest and neighboring pixels. For example, there is a case in which pixel A1 (R, C, B), A2(R, G, S), A3(R, G, S), A4(R, G, B), A5(R, G, B), A6(R, G, B), A7(R, G, B), A8(R, G, B) and A9(R, G, B) are arranged in the up-and-down direction and right-and-left direction, with the pixel-of-interest A5(R, G, B) being set at the center. In this case, with respect to A5(R), an arithmetic operation, that is, A5(R)=A1(R)×q1+A2(R)×q2+A3(R)×q3+A4(R)×q4+A5(R)×q5+A6(R)×q6+A7(R)×q7+A8(R)×q8+A9(R)×q9, is performed. Similar arithmetic operations are executed for G and E. In this arithmetic operation, q is a parameter. By varying this numerical value (coefficient), different effect processes can be executed.

There also is an effect process in which processing is executed in a manner to vary touch (hereinafter referred to as "brush/pen touch"). Specifically, pixels having a high correlation are gathered from among pixels constituting image data, based on a color, etc., and groups of such pixels are formed. Then, with respect to the pixels of each group, the colors of the pixels of the same group are replaced with a representative color of this group.

The group of pixels, whose colors were replaced with the representative color, constitutes the brush/pen touch. According to this image processing, the brush/pen touch that is constituted can be varied by varying the method. of determining the correlation of pixels which are gathered as the group, and varying the shape (length (distance), degree of flatness) of the group that is constituted by the pixels of the same color (representative color). As a result, the picture type of the image represented by the image data can be changed to various picture types. With respect to each picture type, an optimal combination of parameters, such as the degree of correlation used in each process, the length representative of the shape of the group, and the degree of flatness, is set.

To change each of plural items of image data to different brush/pen touches can be realized by adjusting the shape of the group of gathered pixels which constitute the brush/pen touch, for example, the degree of flatness of the group, when the picture type is changed. If the degree of flatness of the group composed of pixels of the same color which represent the brush/pen. touch is increased, the brush/pen touch becomes thicker and, as a result, the touch of the image is displayed with roughness. If the degree of flatness of the group composed of pixels of the same color is decreased, a less brush/pen touch can be created and, as a result, the touch of the image is displayed with fineness.

The picture conversion algorithm, which has been described above in detail, is stored in the picture conversion processor 302 of the control area 300 of the SNS site 10, and the parameter groups are similarly stored in the parameter table 304 of the control area 300.

Next, referring to FIG. 13, a flowchart illustrating a concrete picture conversion process is described. In the server 11, the picture conversion processor 302 shown in FIG. 9 first executes a pre-process (step SC101). The pre-process is a process which is executed commonly, regardless of the picture type.

Since the above-described effect process is executed on each of the pixels, image data needs to be of a bitmap format. Thus, the picture conversion processor 302 converts image data, which is normally expressed in JPEG format, to a bitmap format.

In addition, since the size of image data that is uploaded is various, the picture conversion processor 302 resizes the image data to a number of pixels of the display area, for example, 800×600 pixels. A large image is reduced in size, and a small image is enlarged. The reason for this is that if the size is fixed, it should suffice that the parameters are fixed, and therefore the processing is efficient. Needless to say, at the time of picture conversion of an original image, which will be described later, the picture conversion is executed while keeping the size of uploaded image data unchanged.

Next, the picture conversion processor 302 confirms whether an image which is a target of conversion includes a face, by a face detection process (step SC102). The reason for this is that if a face part in the image is excessively converted, the face part becomes unnatural and thus the face part is subjected to a picture conversion process with particularly high fineness.

In this face detection process, the degree of importance is different between a face part and a background in one image and between a central part and a peripheral part. Thus, in the face detection process, the picture conversion processor 302 creates data of a degree-of-importance map of a process-target image, and stores this data in a degree-of-importance map 306 of the control area 300. Subsequently, the picture conversion processor 302 prompts the user to select a desired picture type from among oil painting, watercolor, pastel, color pencil, . . . (step SC103).

If the desired picture type is selected, the picture conversion processor 302 advances to a flow of a picture conversion algorithm thereof. For example, in the case of oil painting conversion, the process gees to step SC104. In the case of watercolor conversion, the process goes to step SC105. Otherwise, the process goes to a flow of another picture conversion algorithm (step SC106). In the meantime., when the picture conversion processor 302 executes each algorithm, the picture conversion processor 302 refers to the parameter table 304 and importance map 306 of the control area 300 (step SC107, SC108, SC109, SC110).

At the time of the picture conversion of step SC104, SC105 or 3C106, the picture conversion processor 302 executes picture conversion for the image data of the display screen size of table-format display. Incidentally, a tone-changed image after conversion is sent to the terminal 1 of the user, and is displayed on the screen of the terminal 1. Thereafter, if "Decision" is instructed from the user's terminal 1 (step SC112: YES), the picture conversion processor 302 advance to the picture conversion of the original image (step SC113). If redoing with another picture type is instructed (step SC112: NO), picture conversion processor 302 returns to the process of step SC103.

At the time of the picture conversion of the original image in step SC113, the picture conversion processor 302 executes picture conversion by the picture conversion algorithm determined in step SC112, by referring to the parameter table 304 and importance table 306 (step SC114, SC115). Even in the case of the same picture type, if the image size is different, the proper parameters become different. Thus, the parameter table, which is referred to in step SC115, is different from the parameters acquired in step SC107 or SC108.

Thereafter, the picture conversion processor 302 executes a post-process for reconverting the original image, which has been subjected to the picture conversion, to JPEG format (step SC116).

FIG. 14 is a flowchart illustrating the process procedure of an upload/posting process. The server 11 accepts upload of an image (photo) from a member terminal, and stores the image (photo) in the upload image buffer 106 (step SD101). In addition, the server 11 selects the picture type for conversion, in accordance with a selection instruction from the member terminal (step SD102). Using the selected type, the server 11 executes picture conversion of the uploaded image (step SD103).

Thereafter, the picture-converted image, which has been picture-converted in step SD103, is stored in the work buffer 108 (step SD104). When the image is posted, the image is moved to the work area 202 (step SD105). In addition, as the image attribute information 206, the member ID 206A indicative of the poster of the work and the date information 206B indicative of, e.g. the date of posting are written.

FIG. 15 is a flowchart illustrating the process procedure of a browse process. The server 11 transmits a table-display screen of works to the member terminal (step SE101). Although the table-display screen is developed in the display buffer 30, it is detected whether there are works which are grouped in the table-display screen (step SE102). If there are such works, the link display symbol "L", as shown in FIG. 6, is displayed (step SE103). If there are no such works, step SE103 is skipped, and the process goes to a work selection step.

In accordance with a select instruction from the member terminal, any one of the works on the table-display screen is selected (step SE104). Subsequently, such control is executed that the original image, which is an image prior to picture conversion of the selected work, is displayed on the member terminal, and the selected work is downloaded (step SE105).

In order to picture-convert the original image of the image data downloaded in step SE103, the picture type is selected in accordance with a select instruction from the member terminal (step SE106). Thereafter, the process advances to SE107, and the picture conversion process is executed according to the flowchart of FIG. 13.

At this time, many parameters are used for conversion to each picture type. When image data, which has already been picture-converted, is to be picture-converted to another type of tone-changed image data, there is a matching. There is a case in which unnaturalness is not so conspicuous, and there is a case in which unnaturalness is conspicuous. Thus, the parameters of the already picture-converted picture-style image data are compared with the parameters which were selected in step SE106 and were used in the picture conversion in step SE107 (step SE108). It is checked whether the values of the compared parameters are different by a predetermined value or more. If the values of the parameters are excessively different, it is highly possible that an unnatural image is formed. Thus, if it is determined that the values are different by a predetermined value or more, the process returns to step SE106, and selection of another picture type is prompted.

Figure 17A:
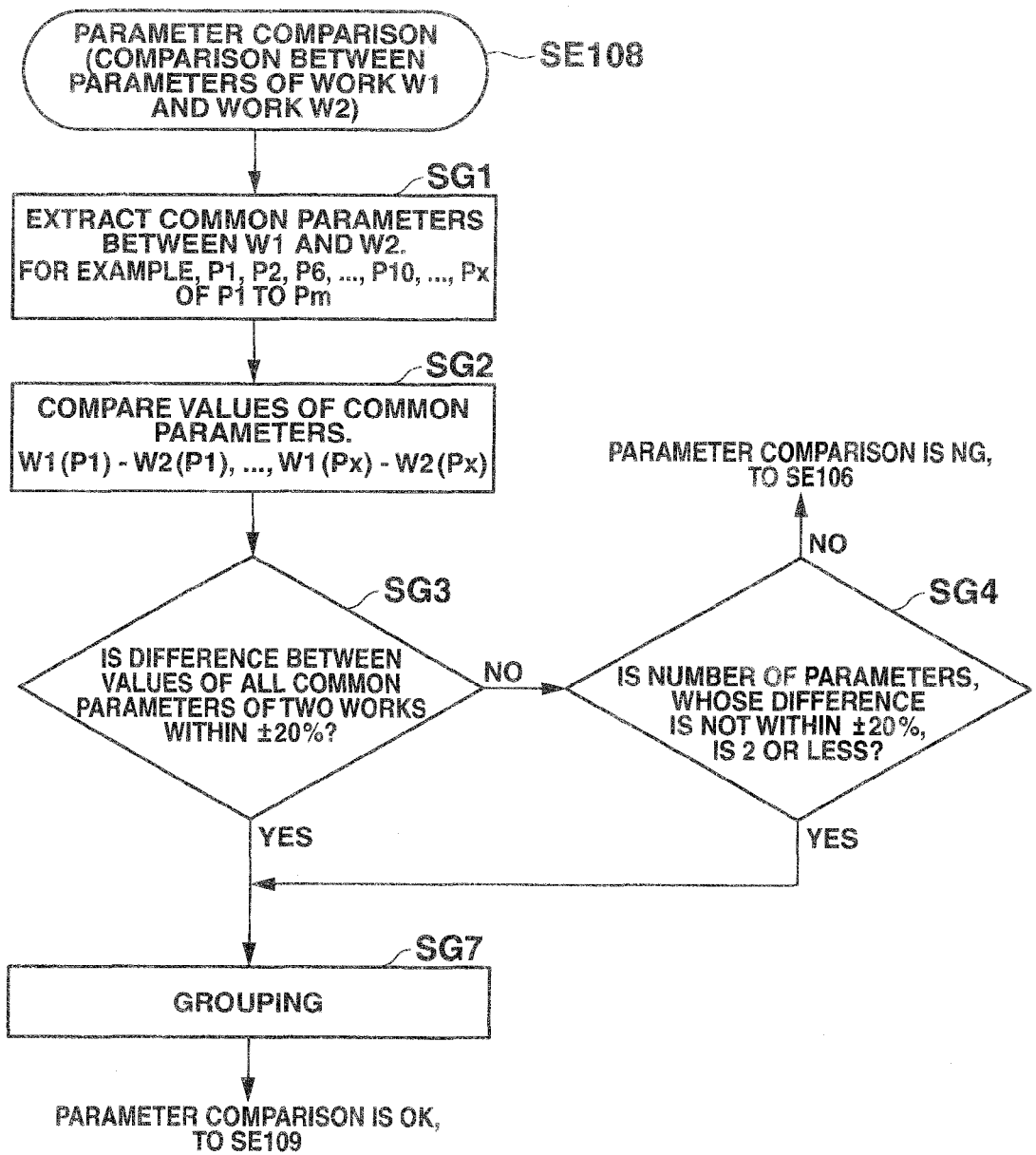
FIG. 17A is a flowchart illustrating the process procedure of parameter comparison in FIG. 15.
Figure 21:
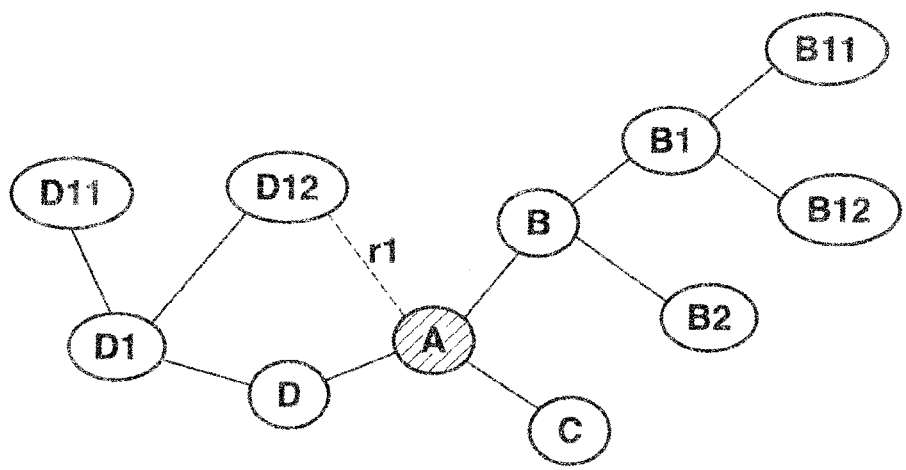
FIG. 21 is a view illustrating a friend relationship in an SNS in the background art.

As described above, if the number of picture types is 12, there are parameter groups P1 to P12, and each parameter group includes parameters $P1_1$ to $P1_m$. Thus, all parameters, which are in a relationship of correspondency, may be compared, or only specific parameters, which particularly strongly affect the picture type, may be compared. Gs a result of parameter comparison, if it is determined that the parameters are different by a predetermined value or more, the process returns to step SE106, and selection of another picture type is prompted. If the values of the parameters are within predetermined values, the process goes to step SE109. Details of step SE106 is shown in FIG. 17A. If the differences between all parameter values, which are common between two works, fall within ±20%, it is determined that the parameters are within a predetermined range.

Details of grouping is shown in FIG. 18. Possible combinations of grouping are as follows: a group of member "A" who posts image data which is not picture-converted and member "B" who executes picture-conversion to picture-style image data; a group of member "C" who converts the already existing picture-style image data, which is the work of member "B", to another type of image data, and a group of member "B" and member "D" who convert the same work of member "A" to different picture types. In a concrete process of grouping, information indicating that all members belong to the same group is written in the group list 118 of the member area 100 of all members.

Even in the case of the same picture type, the values of parameters vary depending on the type of original image data. Thus, for example, such a relationship is not established that conversion from the oil painting style to watercolor style is always possible but conversion from the oil painting style to the color pencil style is always impossible. There may be a case in which some image data could be converted from the oil painting style to watercolor style, but other image data could not he converted. from the oil painting style to water-color style. In the case of conversion between the same picture types, that is, in the case of conversion from the oil painting style to the oil painting style, there is little problem, but conversion may become impossible depending on the setting of ranges of parameters. Needless to say, in the case of the same picture type, the comparison of parameters in step SE108 may be skipped.

The conversion result obtained in step SE107 is stored as a new work in the work buffer 108 in step SE109, and a posting process is executed in step SE110.

Further, in step SE111, a group update is executed for the member who creates the new work and the member who posts the work which is the source of the new work. In the group update, the group list 118 is updated by the grouping controller 314.

FIG. 16 is a flowchart illustrating group update which is executed at a predetermined time. As described above, when a new work is created by using another person's work, both are grouped. There are other conditions for grouping. For example, there is a case in which a member, who possesses a work of picture-style image data which is very close in parameters to picture-style image data of one's own work, is grouped. Aside from copying, there are countless combinations of parameters. Thus, if the parameters of independently created works are close, this means that styles and tastes are close. This being the case, when the difference between the parameter values is smaller than a predetermined value, an embodiment in which grouping is performed is thinkable. However, since the comparison of all works involves an enormous amount of arithmetic operations, the member himself/herself specifies his/her own work, designates the range of search, and executes search within this range of search (step SF102).

Then, the parameters of searched works are compared (step SF104). Details of step SF104 is shown In FIG. 17B. Subsequently, the group list 104K in the various member attribute information 104 of each member is updated (step SF106).

Accordingly, by the execution of the process illustrated in the flowchart of FIG. 16, grouping of works having close parameters can be realized.

Thereafter, common information is sent to the grouped members (step SF108). The creator of this information that is sent may be each member, the administrator of the server 11, or the administrator of the group.

FIG. 17A is a flowchart illustrating the detailed procedure of step SE108 in the flowchart of FIG. 15. To begin with, common parameters between work W1 and work W2 are extracted (step SG1). If there are an m-number of parameters, i.e. parameters $Pi_1$ to $Pi_m$, which are used in the picture conversion in this embodiment, parameters $Pi_1$, $Pi_2$, $Pi_6$, ... $Pi_{10}$ ..., $Pi_x$, which are commonly used between works W1 and W2, are extracted.

Next, the values of these extracted common parameters are compared (step SG2). Specifically, W1 ($Pi_1$), which is the value $Pi_1$ of the parameter of work W1, and W2 ($Pi_1$), which is the value. $Pi_1$ of the same parameter of work W2, are compared, and a difference is found. Then, similarly, W1 ($Pi_2$), W1 ($Pi_6$), W1 ($Pi_{10}$), W1 ($Pi_x$), which are the values $Pi_2$, $Pi_6$, ..., $Pi_{10}$, ..., $Pi_x$ of the parameters of work W1, and W2 ($P1_2$), W2 ($Pi_6$), ..., W2 ($Pi_{10}$), ..., W2 ($Pi_x$), which are the values $Pi_2$, $Pi_6$, ..., $Pi_{10}$, ..., $Pi_x$ of the same parameters of work W2, are compared, and differences are found.

Next, it is determined whether the difference between all parameter values, which are common between works W1 and W2, fall within ±20% (step SG3). if the determination in step SG3 is "YES", the flow returns to step SE109 of FIG. 15 after executing "grouping" in step SG7. That is, if the determination in step SG3 is "YES", the determination in step SE108 in the flowchart of FIG. 15 becomes "OK".

However, if the determination in step SG3 is "NO", it is determined whether the number of parameters, whose difference does not, fall within ±20%, is two or less (step SG4). If the number of parameters, whose difference does not fail within 120%, is greater than two, the picture conversion is "NG", and the process returns to step SE106 in the flowchart of FIG. 15.

FIG. 17A is a flowchart illustrating the detailed procedure of step SE108 in the flowchart of FIG, 15 and step SF104 in the flowchart of FIG. 16. To begin with, common parameters between work W1 and work W2 are extracted (step SG1). If there are an m-number of parameters, i.e. parameters $Pi_1$ to $Pi_m$, which are used in the picture conversion in this embodiment, parameters $Pi_1$, $Pi_2$, $Pi_6$, ... $Pi_{10}$, ..., $Pi_x$, which are commonly used between works W1 and W2, are extracted Next, the values of these extracted common parameters are compared (step SG2). Specifically, W1 ($Pi_1$), which is the value $Pi_1$ of the parameter of work W1, and W2 ($Pi_1$), which is the value $Pi_1$ of the same parameter of work W2, are compared, and a difference is found. Then, similarly, W1 ($Pi_2$), W1 ($Pi_6$), W1 ($Pi_{10}$), W1 ($Pi_x$), which are the values $Pi_2$, $Pi_6$, ..., $Pi_{10}$, ..., $Pi_x$ of the parameters of work W1, and W2 ($Pi_2$), W2 ($Pi_6$), ($Pi_{10}$), ..., W2 ($Pi_x$), which are the values $Pi_2$, $Pi_6$, ..., $Pi_{10}$, ..., $Pi_x$ of the same parameters of work W2, are compared, and differences are found.

It is determined in step SG6 whether the difference between all parameter values common to the two works W1 and W2 falls within ±5%. If the determination in step SG6 is "NO", the process goes to step SF106 in the flowchart of FIG. 16, without executing the process of step SG7. If the determination in step SG6 is "YES", the process executes grouping (step SG7), and then goes to step SF106.

FIG. 18 is a flowchart illustrating the detailed procedure of the grouping (step SG7) in FIG. 17. begin with, it is determined whether the picture conversion in step SE107 in the flowchart of FIG. 15 was executed on one's own work (step SH1). If the picture conversion was executed on one's own work, there is no need to execute grouping, so the process according to this flow is finished.

However, if the picture conversion in step SE107 was executed not on one's own work but on another member's work, it is determined whether the pre-picture-converted image data is the original image data or not (step SH2). If the pre-picture-converted image data is the original image data, it is determined whether there is another work which was created by picture-converting the original image data by the associated member(step SH3). If there is no other work which was created by picture-converting the original age data by the associated member and the picture-converted work is the first one, first grouping is executed. Specifically, the member, who uploaded the original image data, and the member (the associated member), who converted the image data to the tone-changed picture-style image data by the picture conversion module, are grouped (step SH6).

Thus, by the process in step SH6, as shown in FIG. 19A as an example of the first grouping, member "A", who uploads the original image data, and member "B", who converts this image data to tone-changed picture-style image data, are grouped as group g1. In addition, when there are plurality of members who picture-convert the original image data that was uploaded by member "A", the process of step SH6 Is executed plural times and, as shown in FIG. 20, the member "A", who uploads the original image data, and members "B", "C", "E", and "F", who converted this image data to tone-changed picture-style image data, are groped as group g1. Besides, when there are plurality of members who picture-convert original image data that is uploaded by member "I", the process of step SH6 is executed plural times and, as shown in FIG. 20, the member "I", who uploads the original image data, and members "H", "K", and "L", who convert this image data to picture-style tone-changed image data, are groped as group g11.

On the other hand, in the flowchart of FIG. 18, if the determination in step SH3 is "YES", it is determined whether the member, who converts the original image data to other picture-style tone-changed image data, is the same as the member who executes the picture conversion this time (step SH4). If the members are the same, the execution of grouping is needless, so the process according to this flow is finished. However, if the members are not the same but are different, second grouping is executed.

Specifically, the member, who converts the original image data to picture-style tone-changed image data, and the member who executes the picture conversion this time (the member who converts the image data to another type of picture-style tone-changed image data) are grouped (step SH7).

Thus, by the process in step SH7, as shown in FIG. 19B as an example of the second grouping, members "B" and "C", who convert the original image data uploaded by member "A" to picture-style tone-changed image data, are grouped as group g2. In addition, when there are many other members who picture-convert the original image data of the member "A", the process of step SH7 is executed plural times and, as shown in FIG. 20, members "B", "C", "E", and "F", who convert the original image data of member "A" to picture-style tone-changed image data, are groped as group g2. Besides, when there are a plurality of members who picture-convert original image data that is uploaded by member "1", the process of step SH7 is executed plural times and, as shown in FIG. 20, members "H", "K", and "L", who convert the original image data to picture-style tone-changed image data, are groped as group g22.

Furthermore, in the flowchart of FIG. 18, if the determination of step SH2 is "NO" and image data, which is picture-converted, is not the original image data, that is, if picture conversion. is executed from source picture-style tone-changed image data to another picture-style tone-changed image data, it is determined whether the member, who picture-converts the original image data, and the member, who executes the picture conversion this time, are the same or not (step SH5). If the members are the same, the execution of grouping is needless, so the process according to this flow is finished. However, if the members are not the same but are different, third grouping is executed. Specifically, the member, who converts the original Image data to picture-style tone-changed image data, and the member, who further converts this picture-style tone-changed image data to another picture-style tone-changed image data, are grouped (step SH8).

Thus, by the process in step SH8, as shown. in FIG. 19C as an example of the third grouping, member "B", who converts the original image data uploaded by member "A" to picture-style tone-changed image data, and member "D", who picture-converts the picture-style tone-changed image data of the member "B" to other picture-style tone-changed image data, are grouped as group g3. In addition, when there are many other members who picture-converts the picture-style tone-changed image data of the member "B" to other picture-style tone-changed image data, the process of step SH8 is executed many times and, as shown in FIG. 20, members "D", "G", and "H", who convert the picture-style tone-changed image data of member "B" to other picture-style tone-changed image data, are groped as group g3. Besides, if member "M" converts the picture-style tone-changed image data of member "L", who picture-converts the original image data uploaded by member "I", to other picture-style tone-changed image data, the process of step SH8 is executed and, as shown in FIG. 20, members "L" and "M" are groped as group g33.

In the manner as described above, if any one of steps SH6, SH7 and SH8 is executed, the grouping controller 314 updates the group list 104*k* and group list 118. In the meantime, in FIG. 20, in the case where the parameters of the picture-style tone-changed image data, which is picture-converted by the member "H", and the parameters of the picture-style tone-changed image data, which is picture-converted by the member "M", are close, the members "H" and "M" are grouped as group g4 by step SG7 in the flowchart of FIG. 17, which is indicative of the content of the process of step SF104 in the flowchart of FIG. 16. Thus, by the above-described process being executed, information is sent to the members grouped in step SF108 in the flowchart of FIG. 16. Thereby, the following advantageous effects can be obtained.

According to the present embodiment having the above-described structure, in order to activate communication through picture-converted or tone-changed images and works and to create a community, and to share favorite images, members are internally grouped by the frequently used conversion type or favorite conversion type, and sharing of works and event guides can be notified to each group and communication and creation of communities can be efficiently promoted. In addition, a gallery (exhibition) or categorization according to each conversion type can be realized, and as the number of conversion types is increasing hereafter, members can be efficiently and effectively grouped according to favorites, and communication and communities can be activated.

In addition, an ordinary SNS has a friend function of, e.g. common hobbies, but it has no influence on a physical distance. However, according to the present embodiment, since the mode of wrist, terminals is adopted, when members wearing wrist terminals on the arms have, come close to each other within a predetermined range, notifications, for instance, may be issued, and such novel enjoyment can be created.

The above-described embodiment has been directed to the picture conversion SNS system and the wrist terminal. However, this technical concept is applicable to social network services other than the picture conversion SNS system. Moreover, in the above-described embodiment, members having a predetermined correlation are grouped, but the embodiment is applicable to a social network service in which works having a predetermined correlation are grouped.

What is claimed is:

1. A wrist terminal wearable on an arm, comprising:
a processor configured to:
    select a type from a plurality of types of tones;
    create tone-changed image data by changing a tone of original image data to the selected type of tone; and
    automatically group a member who has uploaded the original image data and a member who has certain relevance to the tone-changed image data;
a wireless connection device configured to exchange data in wireless manner with a member terminal;
a display configured to display tone-changed image data which is received from the member terminal via the wireless connection device;
a sensor; and
a display controller configured to display the tone-changed image data on the display, to successively display different types of tone-changed image data when the sensor detects a screen feed operation in a first direction, and to successively display profile images of other members who are grouped, when the sensor detects a screen feed operation in a second direction crossing the first direction.

2. The wrist terminal according to claim 1, wherein the processor is configured to create the tone-changed image data by changing a tone of the image data displayed on the display of the wrist terminal to another tone, by a detection signal of the sensor.

3. A system comprising:
a wrist terminal configured to be wirelessly connected to a member terminal; and
a server configured to make public, on a network, original image data uploaded from the member terminal such that the original image data can be browsed by a plurality of members, create tone-changed image data by changing a tone of the original image data to a tone of a type selected from a plurality of types of tones by one of the members, and group a member who has uploaded the original image data and the member who has created the tone-changed image data,
wherein the wrist terminal is configured to:
    be wearable on an arm and include a display; and
    make a notification when a wrist terminal of another member grouped by the server comes within a predetermined range.

4. A method for a wrist terminal in a system comprising a processor configured to select a type from a plurality of types of tones, create tone-changed image data by changing a tone of original image data to the selected type of tone, make the created tone-changed image data browsable on a member terminal, and automatically group a member who has uploaded the original image data and a member who has certain relevance to the tone-changed image data, the method comprising:
    wirelessly connecting to the member terminal to exchange data therewith;
    displaying tone-changed image data received from the wirelessly-connected member terminal;
    performing an operation detection of detecting a screen feed operation; and
    displaying the tone-changed image data, and sequentially displaying different types of tone-changed image data upon detection of a screen feed operation in a first direction in the operation detection and sequentially displaying profile images of other grouped members upon detection of a screen feed operation in a second direction crossing the first direction.

* * * * *